(12) United States Patent
Schneider et al.

(10) Patent No.: US 8,500,157 B2
(45) Date of Patent: Aug. 6, 2013

(54) KNEE AIRBAG ASSEMBLIES AND RELATED METHODS

(75) Inventors: David W. Schneider, Waterford, MI (US); John F. Witt, Clinton Township, MI (US); Michael Kutchey, Ortonville, MI (US); Jamie R. Fritz, Macomb, MI (US); Mark L. Enders, Pleasant View, UT (US); Louis Mueller, Roy, UT (US); Larry Lunt, Brigham City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/270,462

(22) Filed: Oct. 11, 2011

(65) Prior Publication Data

US 2012/0025496 A1 Feb. 2, 2012

Related U.S. Application Data

(63) Continuation-in-part of application No. 12/430,562, filed on Apr. 27, 2009, now Pat. No. 8,083,254.

(51) Int. Cl.
*B60R 21/217* (2011.01)

(52) U.S. Cl.
USPC ............... 280/728.2; 280/730.1; 280/743.2

(58) Field of Classification Search
USPC ............ 280/730.1, 728.2, 732, 743.1, 743.2
See application file for complete search history.

(56) References Cited

U.S. PATENT DOCUMENTS

| | | | |
|---|---|---|---|
| 3,858,822 A | 1/1975 | Wood | |
| 3,904,222 A | 9/1975 | Bursott et al. | |
| 3,966,227 A | 6/1976 | Cameron | |
| 4,290,627 A | 9/1981 | Cumming et al. | |
| 5,338,061 A | 8/1994 | Nelson et al. | |
| 5,344,184 A | 9/1994 | Keeler et al. | |
| 5,427,410 A | 6/1995 | Shiota et al. | |
| 5,460,400 A | 10/1995 | Davidson | |
| 5,529,337 A | 6/1996 | Takeda et al. | |
| 5,630,621 A | 5/1997 | Schneider | |
| 5,669,627 A | 9/1997 | Marjanski et al. | |
| 5,690,354 A | 11/1997 | Logan et al. | |
| 5,765,867 A | 6/1998 | French | |
| 5,772,239 A | 6/1998 | Seymour | |
| 5,803,487 A | 9/1998 | Kikuchi et al. | |
| 5,810,390 A | 9/1998 | Enders et al. | |
| 5,823,566 A | 10/1998 | Manire | |

(Continued)

FOREIGN PATENT DOCUMENTS

| | | |
|---|---|---|
| DE | 20 2006 014 012 | 8/2006 |
| DE | 10 2008 029 810 | 12/2009 |

(Continued)

OTHER PUBLICATIONS

Non-Final Office Action mailed Mar. 8, 2012 in co-pending U.S. Appl. No. 12/611,676, now published as U.S. publication No. 2011/0101660.

(Continued)

*Primary Examiner* — Drew Brown
(74) *Attorney, Agent, or Firm* — Stoel Rives LLP

(57) ABSTRACT

An airbag assembly can include a stabilizer strap attached to an airbag, and the stabilizer strap can cooperate with a housing to prevent undesired rotation or skewing of the airbag during deployment. In some arrangements, a portion of the airbag is secured to the housing via an inflator.

28 Claims, 28 Drawing Sheets

U.S. PATENT DOCUMENTS

| | | | |
|---|---|---|---|
| 5,845,935 A | 12/1998 | Enders et al. |
| 5,927,748 A | 7/1999 | O'Driscoll |
| 6,010,147 A | 1/2000 | Brown |
| 6,059,312 A | 5/2000 | Staub et al. |
| 6,135,495 A | 10/2000 | Redgrave et al. |
| 6,155,595 A | 12/2000 | Schultz |
| 6,213,496 B1 | 4/2001 | Minami et al. |
| 6,217,059 B1 | 4/2001 | Brown et al. |
| 6,224,129 B1 | 5/2001 | Cisternino et al. |
| 6,254,121 B1 | 7/2001 | Fowler et al. |
| 6,299,205 B1 | 10/2001 | Keshavaraj |
| 6,364,348 B1 | 4/2002 | Jang et al. |
| 6,431,583 B1 | 8/2002 | Schneider |
| 6,454,296 B1 | 9/2002 | Tesch et al. |
| 6,464,255 B1 | 10/2002 | Preisler et al. |
| 6,474,686 B1 | 11/2002 | Higuchi et al. |
| 6,494,484 B2 | 12/2002 | Bosgieter et al. |
| 6,588,793 B2 | 7/2003 | Rose |
| 6,631,920 B1 | 10/2003 | Webber et al. |
| 6,655,711 B1 | 12/2003 | Labrie et al. |
| 6,682,093 B2 | 1/2004 | Tajima et al. |
| 6,685,217 B2 | 2/2004 | Abe |
| 6,715,789 B2 | 4/2004 | Takimoto et al. |
| 6,752,417 B2 | 6/2004 | Takimoto et al. |
| 6,846,005 B2 | 1/2005 | Ford et al. |
| 6,877,765 B2 * | 4/2005 | Rose et al. ............... 280/728.2 |
| 6,913,280 B2 | 7/2005 | Dominissini et al. |
| 6,945,557 B2 | 9/2005 | Takimoto et al. |
| 6,959,944 B2 | 11/2005 | Mori et al. |
| 6,962,363 B2 | 11/2005 | Wang et al. |
| 6,962,366 B2 | 11/2005 | Fukuda et al. |
| 7,000,945 B2 | 2/2006 | Bakhsh et al. |
| 7,000,947 B2 | 2/2006 | Kumagai et al. |
| 7,029,026 B2 | 4/2006 | Morita |
| 7,055,851 B2 | 6/2006 | Takimoto et al. |
| 7,090,245 B2 | 8/2006 | Yoshikawa et al. |
| 7,131,664 B1 | 11/2006 | Pang et al. |
| 7,147,247 B2 | 12/2006 | Hayakawa |
| 7,156,418 B2 | 1/2007 | Sato et al. |
| 7,175,195 B2 | 2/2007 | Morita |
| 7,182,365 B2 | 2/2007 | Takimoto et al. |
| 7,185,912 B2 | 3/2007 | Matsuura et al. |
| 7,195,275 B2 | 3/2007 | Abe |
| 7,195,280 B2 | 3/2007 | Wheelwright et al. |
| 7,201,396 B2 | 4/2007 | Takimoto et al. |
| 7,226,077 B2 | 6/2007 | Abe |
| 7,232,149 B2 | 6/2007 | Hotta et al. |
| 7,261,318 B2 | 8/2007 | Enders |
| 7,281,734 B2 | 10/2007 | Abe et al. |
| 7,314,228 B2 | 1/2008 | Ishiguro et al. |
| 7,314,230 B2 | 1/2008 | Kumagai et al. |
| 7,347,444 B2 | 3/2008 | Wheelwright |
| 7,370,881 B2 | 5/2008 | Takimoto et al. |
| 7,374,201 B2 | 5/2008 | Chausset |
| 7,374,202 B2 | 5/2008 | Lim |
| 7,380,813 B2 | 6/2008 | Lanzinger et al. |
| 7,384,065 B2 | 6/2008 | Takimoto et al. |
| 7,387,311 B2 | 6/2008 | Kanno et al. |
| 7,396,044 B2 | 7/2008 | Bauer et al. |
| 7,434,837 B2 | 10/2008 | Hotta et al. |
| 7,438,310 B2 | 10/2008 | Takimoto et al. |
| 7,487,994 B2 * | 2/2009 | Okada et al. ............... 280/732 |
| 7,549,672 B2 | 6/2009 | Sato et al. |
| 7,566,074 B2 | 7/2009 | Hawthorn et al. |
| 7,568,724 B2 | 8/2009 | Kutchey et al. |
| 7,568,730 B2 | 8/2009 | Kwon |
| 7,631,894 B2 | 12/2009 | Hasebe et al. |
| 7,641,223 B2 | 1/2010 | Knowlden |
| 7,658,408 B2 | 2/2010 | Zofchak et al. |
| 7,658,409 B2 | 2/2010 | Ford et al. |
| 7,695,013 B2 | 4/2010 | Kakstis et al. |
| 7,712,769 B2 | 5/2010 | Hasebe et al. |
| 7,717,460 B2 | 5/2010 | Franke et al. |
| 7,744,118 B2 | 6/2010 | Takimoto et al. |
| 7,748,739 B2 | 7/2010 | Brinker |
| 7,753,405 B2 | 7/2010 | Ishiguro et al. |
| 7,753,407 B2 | 7/2010 | Yokota |
| 7,766,374 B2 | 8/2010 | Abele et al. |
| 7,793,973 B2 | 9/2010 | Sato et al. |
| 7,798,517 B2 | 9/2010 | Ishida |
| 7,819,419 B2 | 10/2010 | Hayashi et al. |
| 7,878,540 B2 | 2/2011 | Takimoto et al. |
| 8,083,254 B2 | 12/2011 | Enders et al. |
| 8,118,325 B2 | 2/2012 | Enders et al. |
| 8,272,667 B2 | 9/2012 | Schneider et al. |
| 8,297,649 B2 | 10/2012 | Enders |
| 8,297,650 B2 | 10/2012 | Enders |
| 8,360,464 B2 | 1/2013 | Enders |
| 2001/0007391 A1 | 7/2001 | Hamada et al. |
| 2002/0044819 A1 | 4/2002 | Shamoon |
| 2002/0149187 A1 | 10/2002 | Holtz et al. |
| 2002/0171231 A1 | 11/2002 | Takimoto et al. |
| 2002/0180187 A1 | 12/2002 | Hayashi |
| 2003/0034637 A1 | 2/2003 | Wang et al. |
| 2003/0209888 A1 | 11/2003 | Davis, Jr. et al. |
| 2005/0001412 A1 | 1/2005 | Schneider et al. |
| 2005/0057028 A1 | 3/2005 | Hayakawa |
| 2005/0062265 A1 | 3/2005 | Hotta et al. |
| 2005/0151351 A1 | 7/2005 | Enders et al. |
| 2005/0194767 A1 | 9/2005 | Freisler et al. |
| 2005/0194771 A1 | 9/2005 | Clark et al. |
| 2005/0212275 A1 | 9/2005 | Hasebe |
| 2005/0230939 A1 | 10/2005 | Abe et al. |
| 2005/0242551 A1 | 11/2005 | Noguchi et al. |
| 2006/0279073 A1 | 12/2006 | Hotta et al. |
| 2007/0057487 A1 | 3/2007 | Kim |
| 2007/0120346 A1 | 5/2007 | Kwon |
| 2007/0200321 A1 | 8/2007 | Heitplatz et al. |
| 2007/0246920 A1 | 10/2007 | Abele et al. |
| 2007/0267852 A1 | 11/2007 | Enders |
| 2008/0048418 A1 | 2/2008 | Remley et al. |
| 2008/0157509 A1 | 7/2008 | Abe et al. |
| 2008/0217892 A1 | 9/2008 | Maripudi et al. |
| 2008/0238048 A1 | 10/2008 | Ishida |
| 2009/0045607 A1 | 2/2009 | Fukuyama et al. |
| 2009/0058048 A1 | 3/2009 | Ishida et al. |
| 2009/0058052 A1 | 3/2009 | Ford et al. |
| 2009/0085333 A1 | 4/2009 | Imaeda et al. |
| 2009/0134611 A1 | 5/2009 | Wigger et al. |
| 2009/0146400 A1 | 6/2009 | Knowlden |
| 2009/0152842 A1 | 6/2009 | Benny et al. |
| 2009/0152847 A1 | 6/2009 | Hong et al. |
| 2009/0184498 A1 | 7/2009 | Takimoto et al. |
| 2009/0212541 A1 | 8/2009 | Wallat et al. |
| 2009/0242308 A1 | 10/2009 | Kitte et al. |
| 2010/0025973 A1 | 2/2010 | Jang et al. |
| 2010/0090445 A1 | 4/2010 | Williams et al. |
| 2010/0270775 A1 | 10/2010 | Enders et al. |
| 2010/0270779 A1 | 10/2010 | Enders et al. |
| 2010/0270782 A1 | 10/2010 | Enders et al. |
| 2011/0012327 A1 | 1/2011 | Enders |
| 2011/0095512 A1 | 4/2011 | Mendez |
| 2011/0101660 A1 | 5/2011 | Schneider et al. |
| 2011/0148077 A1 | 6/2011 | Enders |
| 2012/0049488 A1 | 3/2012 | Enders |
| 2012/0049497 A1 | 3/2012 | Enders |
| 2012/0242066 A1 | 9/2012 | Chavez et al. |

FOREIGN PATENT DOCUMENTS

| | | |
|---|---|---|
| WO | WO 02/04262 | 1/2002 |
| WO | WO 2010/126623 | 11/2010 |
| WO | WO 2011/008916 | 1/2011 |
| WO | WO 2011/056810 | 5/2011 |
| WO | WO 2011/079178 | 6/2011 |
| WO | WO-2012/030482 | 3/2012 |

OTHER PUBLICATIONS

Non-Final Office Action mailed Mar. 12, 2012 in co-pending U.S. Appl. No. 12/872,323, now published as U.S. Publication No. US 2012/0049488.

Amendment and Response to Restriction Requirement filed Jun. 20, 2012 in co-pending U.S. Appl. No. 12/645,130, now published as U.S. Publication No. US 2011/0148077.

Office Action mailed Jul. 19, 2012 in co-pending U.S. Appl. No. 12/645,130, now published as U.S. Publication No. US 2011/0148077.

Amendment and Response to Office Action filed May 29, 2012 in co-pending U.S. Appl. No. 12/504,544, now published as U.S. Publication No. US 2011/0012327.
Notice of Allowance and Fee(s) Due mailed Jun. 28, 2012 in co-pending U.S. Appl. No. 12/504,544, now published as U.S. Publication No. US 2011/0012327.
Amendment and Response to Office Action filed Jun. 8, 2012 in co-pending U.S. Appl. No. 12/611,676, now published as U.S. Publication No. US 2011/0101660.
Notice of Allowance and Fee(s) Due mailed Jun. 19, 2012 in co-pending U.S. Appl. No. 12/611,676, now published as U.S. Publication No. US 2011/0101660.
Amendment and Response to Office Action filed Sep. 12, 2012 in co-pending U.S. Appl. No. 12/872,323, now published as U.S. Publication No. US 2012/0049488.
Amendment and Response to Office Action filed Jun. 14, 2012 in co-pending U.S. Appl. No. 12/872,946, now published as U.S. Publication No. US 2012/0049497.
Notice of Allowance and Fee(s) Due mailed Jun. 28, 2012 in co-pending U.S. Appl. No. 12/872,946, now published as U.S. Publication No. US 2012/0049497.
Restriction and/or Election Requirement mailed Jan. 20, 2011 in co-pending U.S. Appl. No. 12/430,562, now published as U.S. Publication No. US 2010/0270775.
Amendment and Response to Requirement of Election of Species filed Feb. 22, 2011 in co-pending U.S. Appl. No. 12/430,562, now published as U.S. Publication No. US 2010/0270775.
Office Action mailed Mar. 30, 2011 in co-pending U.S. Appl. No. 12/430,562, now published as U.S. Publication No. US 2010/0270775.
Amendment and Response to Office Action filed Jun. 30, 2011 in co-pending U.S. Appl. No. 12/430,562, now published as U.S. Publication No. US 2010/0270775.
Examiner's Interview Summary mailed Jul. 6, 2011 in co-pending U.S. Appl. No. 12/430,562, now published as U.S. Publication No. US 2010/0270775.
Notice of Allowance and Fee(s) Due mailed Aug. 23, 2011 in co-pending U.S. Appl. No. 12/430,562, now published as U.S. Publication No. US 2010/0270775.
Office Action mailed Jan. 21, 2011 in co-pending U.S. Appl. No. 12/430,274, now published as U.S. Publication No. US 2010/0270779.
Amendment and Response to Office Action filed Jul. 21, 2011 in co-pending U.S. Appl. No. 12/430,274, now published as U.S. Publication No. US 2010/0270779.
Notice of Allowance and Fee(s) Due mailed Oct. 18, 2011 in co-pending U.S. Appl. No. 12/430,274, now published as U.S. Publication No. US 2010/0270779.
Restriction Requirement mailed Sep. 15, 2010 in co-pending U.S. Appl. No. 12/430,246, now published as U.S. Publication No. US 2010/0270782.
Amendment and Response to Requirement for Election of Species filed Oct. 12, 2010 in co-pending U.S. Appl. No. 12/430,246, now published as U.S. Publication No. US 2010/0270782.
Office Action mailed Oct. 29, 2010 in co-pending U.S. Appl. No. 12/430,246, now published as U.S. Publication No. US 2010/0270782.
Amendment and Response to Office Action filed Apr. 28, 2011 in co-pending U.S. Appl. No. 12/430,246, now published as U.S. Publication No. US 2010/0270782.
Final Office Action mailed Jun. 24, 2011 in co-pending U.S. Appl. No. 12/430,246, now published as U.S. Publication No. US 2010/0270782.
Preliminary Amendment filed Aug. 31, 2009 in co-pending U.S. Appl. No. 12/504,544, now published as U.S. Publication No. US 2011/0012327.
Preliminary Amendment filed Jul. 15, 2010 in co-pending U.S. Appl. No. 12/504,544, now published as U.S. Publication No. US 2011/0012327.
Office Action mailed Dec. 13, 2010 in co-pending U.S. Appl. No. 12/504,544, now published as U.S. Publication No. US 2011/0012327.
Amendment and Response to Office Action filed Jun. 13, 2011 in co-pending U.S. Appl. No. 12/504,544, now published as U.S. Publication No. US 2011/0012327.
Final Office Action mailed Jun. 29, 2011 in co-pending U.S. Appl. No. 12/504,544, now published as U.S. Publication No. US 2011/0012327.
Examiner's Interview Summary mailed Jul. 7, 2011 in co-pending U.S. Appl. No. 12/504,544, now published as U.S. Publication No. US 2011/0012327.
Amendment and Response After Final filed Aug. 29, 2011 in co-pending U.S. Appl. No. 12/504,544, now published as U.S. Publication No. US 2011/0012327.
Advisory Action mailed Sep. 9, 2011 in co-pending U.S. Appl. No. 12/504,544, now published as U.S. Publication No. US 2011/0012327.
Request for Continued Examination filed Oct. 6, 2011 in co-pending U.S. Appl. No. 12/504,544, now published as U.S. Publication No. US 2011/0012327.
Office Action mailed Dec. 1, 2011 in co-pending U.S. Appl. No. 12/504,544, now published as U.S. Publication No. US 2011/0012327.
Restriction Requirement mailed Dec. 14, 2011 in co-pending U.S. Appl. No. 12/611,676, now published as U.S. Publication No. US 2011/0101660.
Restriction Requirement mailed Oct. 27, 2011 in co-pending U.S. Appl. No. 12/872,946.
Amendment and Response to Requirement of Election of Species filed Nov. 28, 2011 in co-pending U.S. Appl. No. 12/872,946.
Office Action mailed Dec. 14, 2011 in co-pending U.S. Appl. No. 12/872,946.
Notification of Transmittal of the International Search Report and the Written Opinion of the International Searching Authority mailed Mar. 30, 2010 in International Application No. PCT/US2010/021343.
Notification of Transmittal of the International Search Report and the Written Opinion of the International Searching Authority mailed Feb. 18, 2011 in International Application No. PCT/US2010/061744.
Notification of Transmittal of the International Search Report and the Written Opinion of the International Searching Authority mailed Sep. 23, 2010 in International Application No. PCT/US2010/042070.
Notification of Transmittal of the International Search Report and the Written Opinion of the International Searching Authority mailed Jan. 3, 2011 in International Application No. PCT/US2010/055197.
Co-pending U.S. Appl. No. 13/290,856, titled Knee Airbag Folding Patterns and Assemblies and Related Methods, filed Nov. 7, 2011.
Restriction Requirement mailed Jan. 20, 2012 in co-pending U.S. Appl. No. 12/645,130, now published as U.S. Publication No. US 2011/0148077.
Amendment and Response to Restriction Requirement filed Jan. 17, 2012 in co-pending U.S. Appl. No. 12/611,676, now published as U.S. Publication No. US 2011/0101660.
Notification of Transmittal of the International Search Report and the Written Opinion of the International Searching Authority mailed Jan. 26, 2012 in International Application No. PCT/US2011/046952.
Notice of Allowance and Fee(s) Due mailed Apr. 10, 2013 in co-pending U.S. Appl. No. 12/645,130, now published as U.S. Publication No. US 2011/0148077.
Office Action mailed Mar. 20, 2013 in co-pending U.S. Appl. No. 13/290,856.
Notification of Transmittal of the International Search Report and the Written Opinion of the International Searching Authority mailed Jan. 4, 2013 in International Application No. PCT/US2012/058873.
Applicant-Initiated Interview Summary mailed Dec. 18, 2012 in co-pending U.S. Appl. No. 12/645,130, now published as U.S. Publication No. US 2011/0148077.
Amendment and Response filed Dec. 19, 2012 in co-pending U.S. Appl. No. 12/645,130, now published as U.S. Publication No. US 2011/0148077.
Notice of Allowance and Fee(s) Due mailed Oct. 4, 2012 in co-pending U.S. Appl. No. 12/872,322, now published as U.S. Publication No. US 2012/0049488.

* cited by examiner

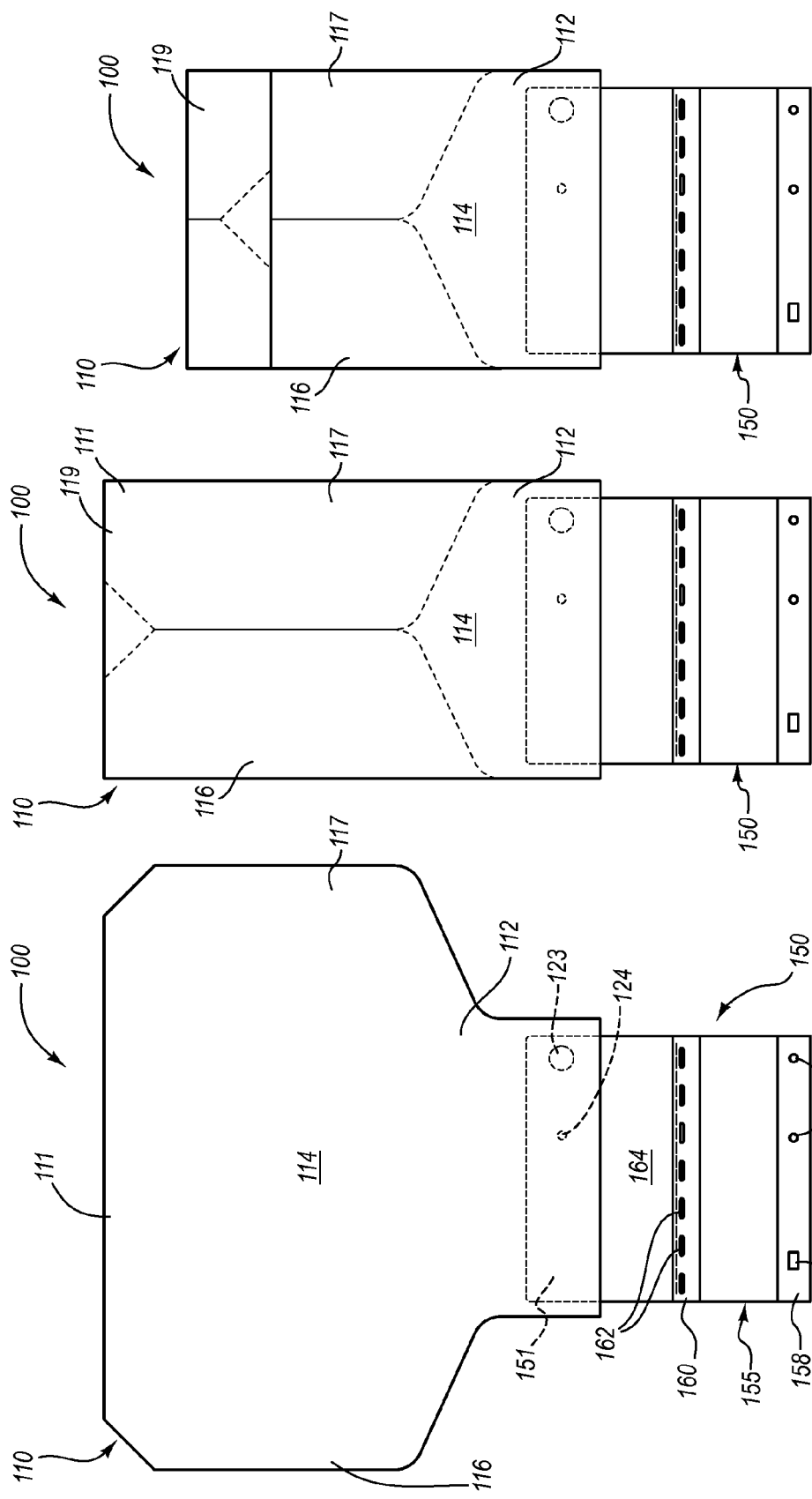

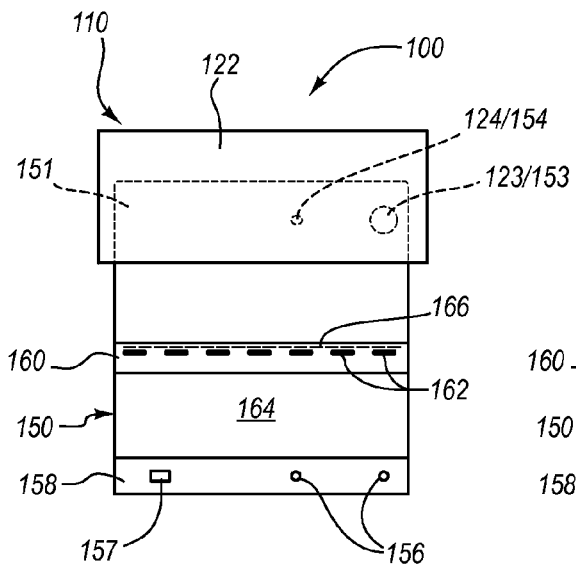
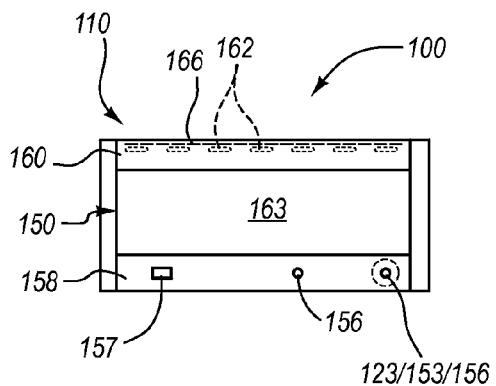
FIG. 13A          FIG. 13B
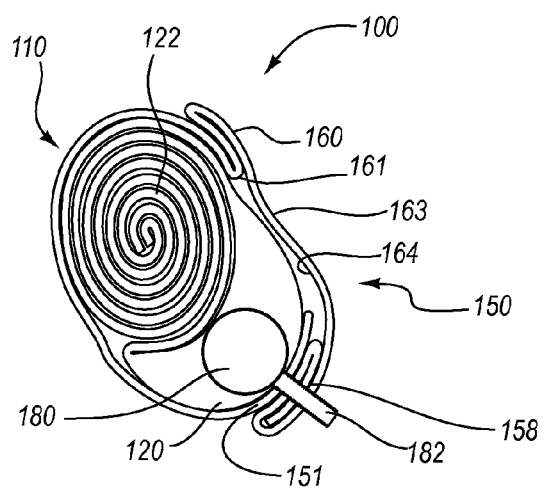
FIG. 14

KNEE AIRBAG ASSEMBLIES AND RELATED METHODS

CROSS REFERENCE TO RELATED APPLICATIONS

This Application is a continuation-in-part of U.S. patent application Ser. No. 12/430,562, filed Apr. 27, 2009, titled KNEE AIRBAG ASSEMBLIES CONFIGURED FOR INFLATOR INSERTION AND INFLATOR-MEDIATED COUPLING TO AN AIRBAG HOUSING, which published as U.S. Patent Application Publication No. 2010/0270775 A1 on Oct. 28, 2010; the entire contents of the foregoing application and publication are hereby incorporated by reference herein.

TECHNICAL FIELD

The present disclosure relates generally to the field of automotive protective systems. More specifically, the present disclosure relates to inflatable airbag cushions and related assemblies, such as knee airbags and knee airbag assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 11A is a rear elevation view of the airbag assembly of FIG. 2, wherein the airbag cushion is in an extended configuration prior to being subjected to a method for folding an airbag cushion.

FIG. 11B is a rear elevation view of the airbag assembly of FIG. 11A after side portions of the airbag cushion have been tucked in accordance with a method for folding an airbag cushion.

FIG. 11C is a rear elevation view of the airbag assembly of FIG. 11B after a top portion of the airbag cushion has been folded in accordance with a method for folding an airbag cushion.

FIG. 13A is a rear elevation view of the airbag assembly of FIG. 12D.

FIG. 13B is a rear elevation view of the airbag assembly of FIG. 13A after a bag strap has been wrapped around the cushion in accordance with a method for folding an airbag cushion.

FIG. 14 is a side elevation view of the airbag assembly of FIG. 13B.

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, knee airbag, or any other airbag type. The embodiments discussed hereafter are primarily of a knee airbag variety, although it may be possible to employ at least some of the features of these airbags with other airbag varieties.

Front airbags are typically installed in the steering wheel and instrument panel of a vehicle. During installation, the airbags are rolled, folded, and/or otherwise packed, and are retained in the packaged state behind a cover. During a collision event, vehicle sensors trigger the activation of an inflator, which rapidly fills the airbag with inflation gas. Thus the airbag rapidly changes conformation from the packed configuration to an expanded configuration.

Figure 1A:
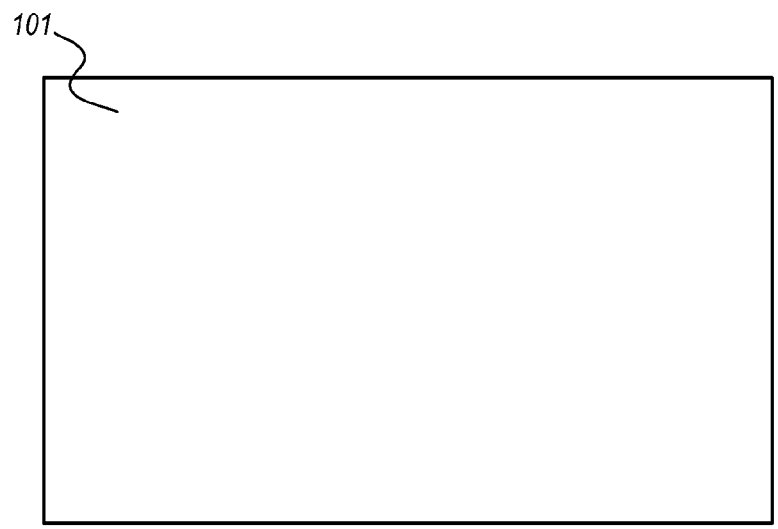
FIG. 1A is a top plan view of a panel of material from which a portion of an airbag cushion may be formed, which in turn, comprises a portion of an airbag assembly.
Figure 1B:
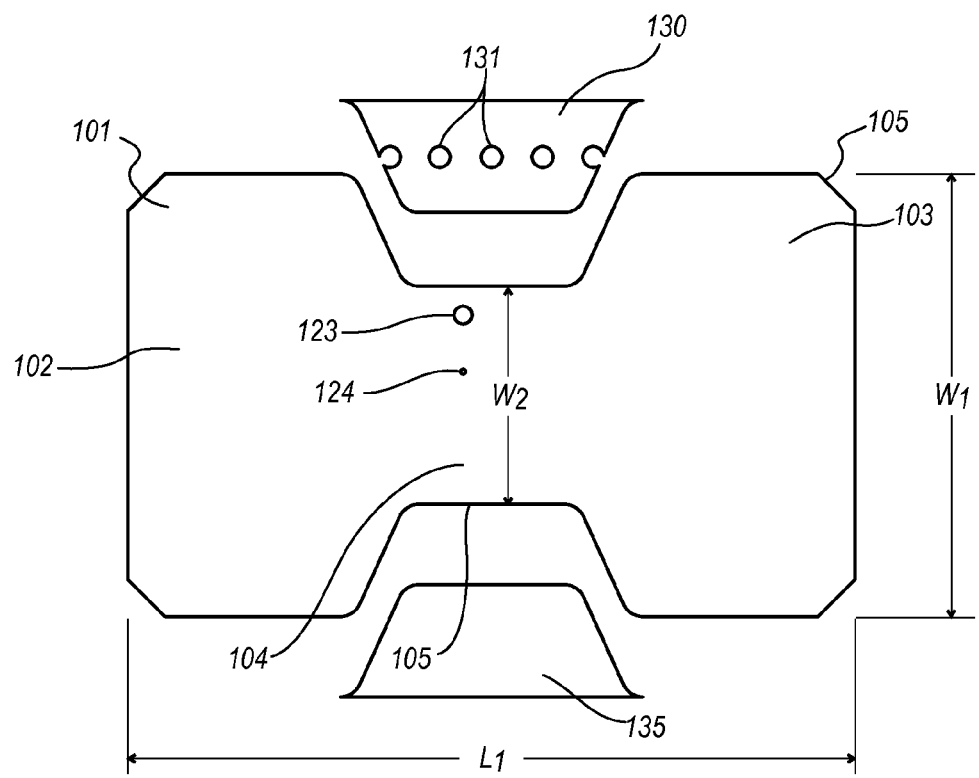
FIG. 1B is a top plan view of the panel of material of FIG. 1A after portions of the panel have been removed.

FIGS. 1A-1B are a top elevation views of a panel of material 101 from which a portion of an airbag cushion may be formed. Panel 101 comprises a sheet of fabric that may comprise a woven nylon material, or any other suitable material, such as those that are well known in the art. Panel 101 comprises a rectangular shape that is defined by a perimeter 105 and has a first portion 102, a second portion 103, and a middle portion 104. First tether 130 and second tether 135 may be cut from the middle portion of panel 101 such that after being cut, panel 101 may be said to have an "I" or "H" shape. The length and/or width of panel 101 may be varied according to different embodiments. For example, width $W_1$ may be from about 400 mm to about 600 mm and length $L_1$ may be from about 600 mm to 900 mm.

FIG. 1B depicts panel 101 after first and second tethers 130 and 135 have been cut from panel 101, after which a second width $W_2$ is defined by the middle portion 104. $W_2$ may be from about 250 mm to about 550 mm. Width $W_2$ of middle portion 104 may comprise about 110% of the width of an airbag housing of airbag assembly 100. An inflator insert aperture 123 and an inflator mounting stem aperture 124 may be formed in middle portion 104 by cutting, stamping, or as a result of the employment of a one-piece-weaving technique. FIG. 1B depicts the corners of panel 101 as being trimmed compared to the corners of the panel as shown in FIG. 1A; however, the corners may be trimmed or not. Embodiments of an inflatable airbag cushion formed from a panel that does not have trimmed corners may have a perimeter seam that angles across the panel's corners, as sown in FIG. 1B, in which case an inflatable void of the cushion may comprise corners similar to those sown in FIG. 1B.

Figure 2:
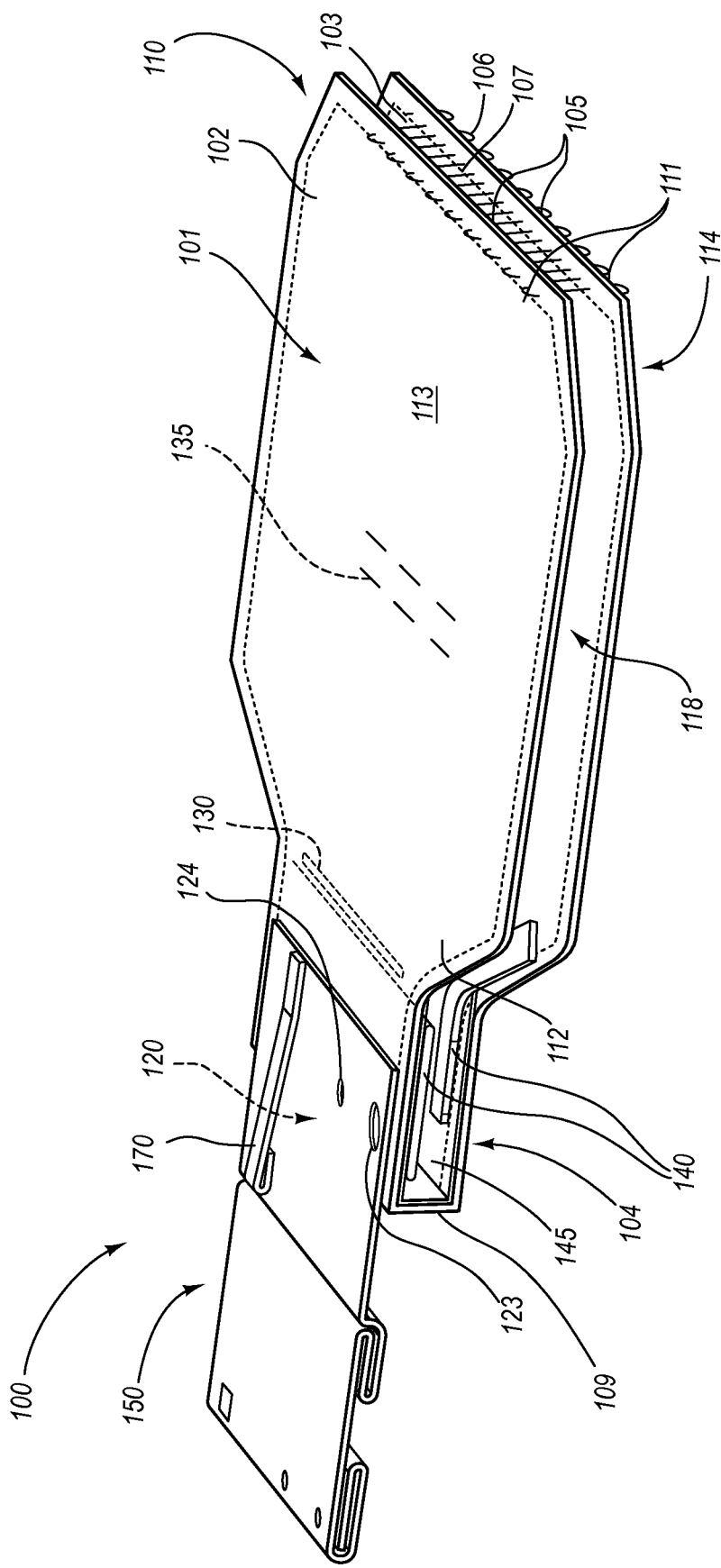
FIG. 2 is a bottom perspective view of a portion of an embodiment of an airbag assembly.
Figure 3:
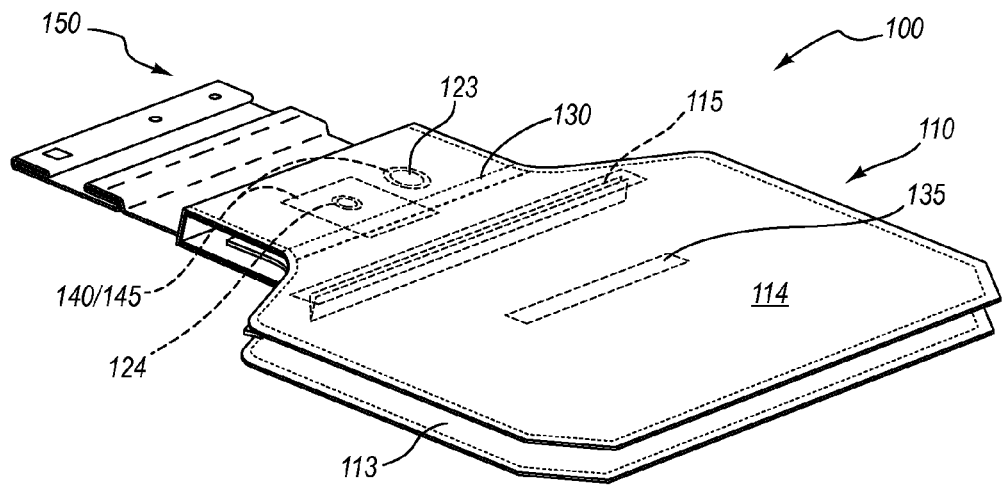
FIG. 3 is a top perspective view of the airbag assembly of FIG. 2 in which the assembly has been rotated 180 degrees about a longitudinal axis thereof.
Figure 4:
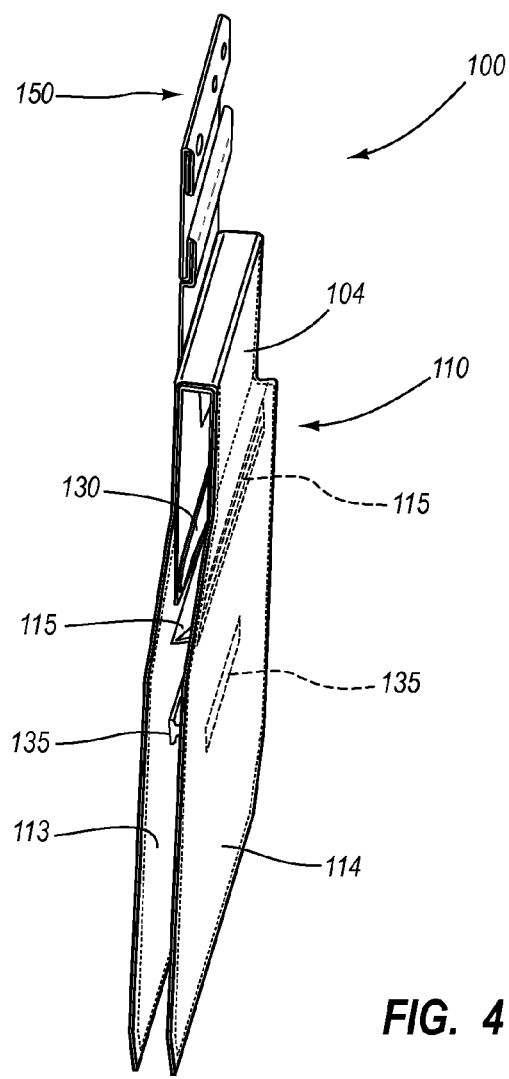
FIG. 4 is a side perspective view of the airbag assembly of FIG. 2.

FIGS. 2-4 are perspective views of a portion of airbag assembly 100, wherein FIG. 2 is a bottom perspective view, FIG. 3 is a top perspective view, and FIG. 4 is a side perspective view. Assembly 100 may comprise a cushion 110, a first tether 130, a second tether 135, reinforcements 140, heat panels 145, a bag strap 150, and a stabilizer strap 170. After the first and second tethers have been cut from panel of material 101 the panel may be folded at middle portion 104 to form a fold 109. When panel 101 is folded, first portion 102 and second portion 103 are brought in close proximity such that the planes of the first and second portions are in a substantially parallel orientation. Fold 109 may comprise one or more discrete folds, or the fold may comprise a more general "U" shape.

Once membrane 101 is folded, stitching 106 may be applied around perimeter 105 such that the first and second portions 102 and 103 are coupled together. After being folded and stitched together, it may be said that panel of material 101 has been configured as an inflatable airbag cushion membrane 110, which may also be referred to as an inflatable airbag cushion, cushion membrane, cushion, or airbag. As such, the cushion membrane has an inflatable void 118. For clarity in depicting various structures and characteristics of assembly 100, in some of the following figures, cushion 110 is shown without the perimeter being sewn together.

Cushion membrane 110 may described as having an upper portion 111, a lower portion 112, a front face 113, and a rear face 114. The terms "upper," "lower," "front," "rear," and other directional terms are used herein with respect to an orientation that the airbag assembly 100, or components thereof, can have when installed in a vehicle, as viewed from the perspective of a vehicle occupant. For example, the directional terms for the portions and faces of the cushion membrane 110 are used relative to a deployed state of the cushion membrane 110 within a vehicle, as viewed by a vehicle occupant. In particular, when the cushion membrane 110 is deployed, the front face 113 can be closer to the vehicle occupant (e.g., closer to the rearward end of the vehicle), and thus represents the front of the cushion from the perspective of the vehicle occupant, whereas the rear face 114 can be further from the vehicle occupant (e.g., closer to the forward end of the vehicle), and thus represent the rear of the cushion from the perspective of the vehicle occupant. The upper portion 111 of cushion 110 is the portion of the cushion that is closest to the headliner of a vehicle when the cushion is in a deployed state. The lower portion 112 is below upper portion 111 when cushion 110 is in a deployed state, and is closest to a floor of the vehicle. The term "lower portion" is not necessarily limited to the portion of cushion 110 that is below a transverse medial plane of the cushion, when the cushion is in the deployed state, but may include less than half, more than half or exactly half of the bottom portion of the cushion. Likewise, the term "upper portion" is not necessarily limited to the portion of cushion 110 that is above a transverse medial plane of the cushion, but may include less than half, more than half or exactly half of the top portion of the cushion.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle. Also, the cushion membrane may comprise one or more pieces of any suitable material, such as those that are well known in the art (e.g., a woven nylon fabric). Additionally, the airbag cushion may be manufactured using a variety of techniques such as one-piece weaving, "cut and sew," and/or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Once the panel of material has been configured as an inflatable cushion 110, the cushion may be coupled with additional components to form an inflatable airbag cushion assembly 100, as depicted in FIG. 2. In the illustrated embodiment, bag strap 150, stabilizer strap 170, and first tether 130 have been coupled to membrane 101 at middle portion 104. Second tether 135 is coupled to membrane 101 closer to upper portion 111 than first tether 130. First and second tethers 130 and 135 are coupled to front face 113 and extend to, and are coupled to, rear face 114. In other words, the first and second tethers are located between the front and rear faces such that the tethers may be said to be located within the inflatable void 118 of the inflatable airbag cushion. First and second tethers 130 and 135 may be coupled to coupled to front and rear faces 113 and 114 by stitching, or any other suitable technique.

Each tether may not be symmetrically attached to the cushion membrane on the front face and the rear face. For example, the portions of the first and second tethers that are coupled to the rear face 114 of the membrane may be located between about 20 mm and 30 mm closer to fold 109 than the portions of the first and second tethers that are coupled to the front face 113 of the membrane. In other words, the point at which the first and second tethers are coupled to the front face of the inflatable cushion membrane may be located more towards the upper portion of the cushion that the point at which the first and second tethers are coupled to the rear face of the inflatable cushion.

First tether 130 may be located between middle portion 104 and first and second portions 102 and 103 and may be oriented such that the tether runs transversely across the middle portion of cushion 110. In one embodiment, the first tether runs the entire width of the cushion, from perimeter to perimeter. First tether 130 may comprise one or more apertures (131), as depicted in FIG. 1B, wherein the apertures are configured to allow inflation gas to pass from a first side of the first tether to a second side of the tether. First tether 130 may be described as running transversely across a majority of the width of cushion 110 and is coupled to front and rear faces 113 and 114 of the cushion. First tether 130 is positioned within cushion 110 such that when the cushion is deployed, the first tether is located outside the housing. First tether 130 may be located between the inflator 180 (see FIG. 15) and a portion of inflatable void 118, such that the plurality of apertures may allow inflation gas to pass from an inflator-proximal side of the tether to an inflator distal side of the tether. As such, the apertures may allow inflation gas to flow from the inflator into the inflatable void. The apertures may each comprise a diameter of about 33 mm and may be sewn concentrically using a single needle lock stitch with about a 3 mm off-set.

Second tether 135 may be located between about 33% to about 50% the distance from first tether 130 to a top edge of upper portion 111 of cushion 110. Generally, the second tether may be about 50% the width as the airbag cushion. For example, in one embodiment, the second tether is about 250 mm wide and the inflatable airbag cushion is about 500 mm wide.

Bag strap 150 may comprise a piece of woven fabric that is coupled to attachment portion 120 of cushion 110. Attachment portion 120 is located on front face 113 at middle portion 104. As such, bag strap 150 is coupled to front face 113 of cushion 110, and may be coupled to the cushion via stitching or any other suitable technique. Bag strap 150 may aid in retaining cushion 110 in a packaged configuration; in obtaining favorable airbag cushion deployment characteristics; and in coupling the cushion to an airbag housing.

One or more reinforcements 140 may be placed at high stress points in assembly 100, wherein the reinforcements comprise one or more pieces of fabric that may the same or different than the fabric from which cushion 110 is formed. For example, one or more reinforcements may be sewn into perimeter seam 107 near where middle portion 104 of cushion 110 extends to become lower portion 112 of front and rear faces 113 and 114. Additionally, one or more layers of reinforcement may be coupled to cushion 110 at an attachment area 120, near inflator apertures 123 and 124, wherein the reinforcement may comprise the same material or a different material than reinforcement 140.

Heat resistant fabric 145 may be coupled near the inflator attachment area 120 and may be employed in addition to or instead of reinforcements at inflator apertures 123 and 124. The heat resistant fabric may comprise a plain woven fiberglass material with a silicone coating, wherein the fiberglass strands in the fabric comprise E-glass, S-glass, or S2-glass grades of fiberglass. If present, the silicone coating may be applied to one side of the fabric and the fabric oriented within assembly 100 such that the silicone coated side faces the inflator.

One skilled in the art will recognize that a variety of types and configurations of heat resistant materials and coatings, as well as reinforcements may be employed without diverging from the spirit of the present disclosure. For example, the fabric need not be plain woven, but may have a more random fiber orientation of sun bond material. Also, the heat resistant material may comprise one or more of a variety of different fibers such as para-aramid synthetic fibers that are sold as Kevlar brand fibers, carbon, hemp, nylon, and polyester. Further, the heat resistant coating may comprise one or more materials such as neoprene, urethane, phenolic materials, and other flexible epoxies. In some embodiments, the reinforcement material and the heat resistant material may comprise the same material.

FIG. 3 depicts a portion of airbag assembly 100 from a top perspective view, wherein the airbag assembly has been rotated 180 degrees from the view of FIG. 2. In this view, front face 113 of cushion 110 is below rear face 114, and the dashed outlines of first and second tethers 130 and 135 are visible. Also shown are inflator insert aperture 123, inflator stem aperture 124, and the dashed outline of reinforcement and/or heat shield 140/145.

A pleat 115 may be formed in rear panel 114, such that the front panel is not as long as front panel 113. In other words, a distance from the upper portion 111 to the lower portion 112 is smaller for rear face 114 than front face 113. Pleat 115 is located between first and second tethers 130 and 135 and may be formed by folding rear panel 114 back upon itself such that a fold of cushion membrane 110 is created that extends into inflatable void 118 in the direction of front panel 113. Pleat 115 may retained by employing a double needle chain stitch. The pleat may be gradually formed and retained in cushion 110 by creating two arcs of stitching at each end of the pleat and a straight stitch in the middle of the pleat, or in another embodiment, the ends of the pleat may be stitched such that the pleat is tapered at its ends. In another embodiment, the stitch and pleat may form a single radius arc.

The portion of the pleat that extends toward the front face may have a length of about 20 mm, in which case the rear panel is shortened about 40 mm. In another embodiment, the pleat extends about 50 mm such that the rear panel is shortened about 100 mm. The width of the full depth portion of pleat 115 may correspond to the width of first and second tethers 130 and 135 such that the portion of the pleat that is the full depth is about as wide as the tethers. In one embodiment, the airbag cushion is about 500 mm wide, the tethers are about 240 mm wide, and the full depth portion of the pleat is also about 240 mm wide, although the entire pleat extends about 400 mm.

First tether 130, second tether 135, and pleat 115 are configured to aid the inflatable cushion membrane in following a predetermined deployment trajectory. Additionally, the tethers and the pleat may be configured such that the inflatable cushion adopts a predetermined shape during deployment and upon full or substantially full inflation. For example, when fully or substantially inflated, the inflatable cushion may be variously described as adopting an approximately "C" shape, a banana shape, or a crescent shape.

FIG. 4 is a perspective view of a portion of airbag assembly 100, which depicts cushion 110, first tether 130, second tether 135, pleat 115, and bag strap 150. Portions of the first and second tethers are visible between front and rear faces 113 and 114. Bag strap 150 is coupled to front face 113 of cushion 110 at middle portion 104 of the cushion.

Figure 5:
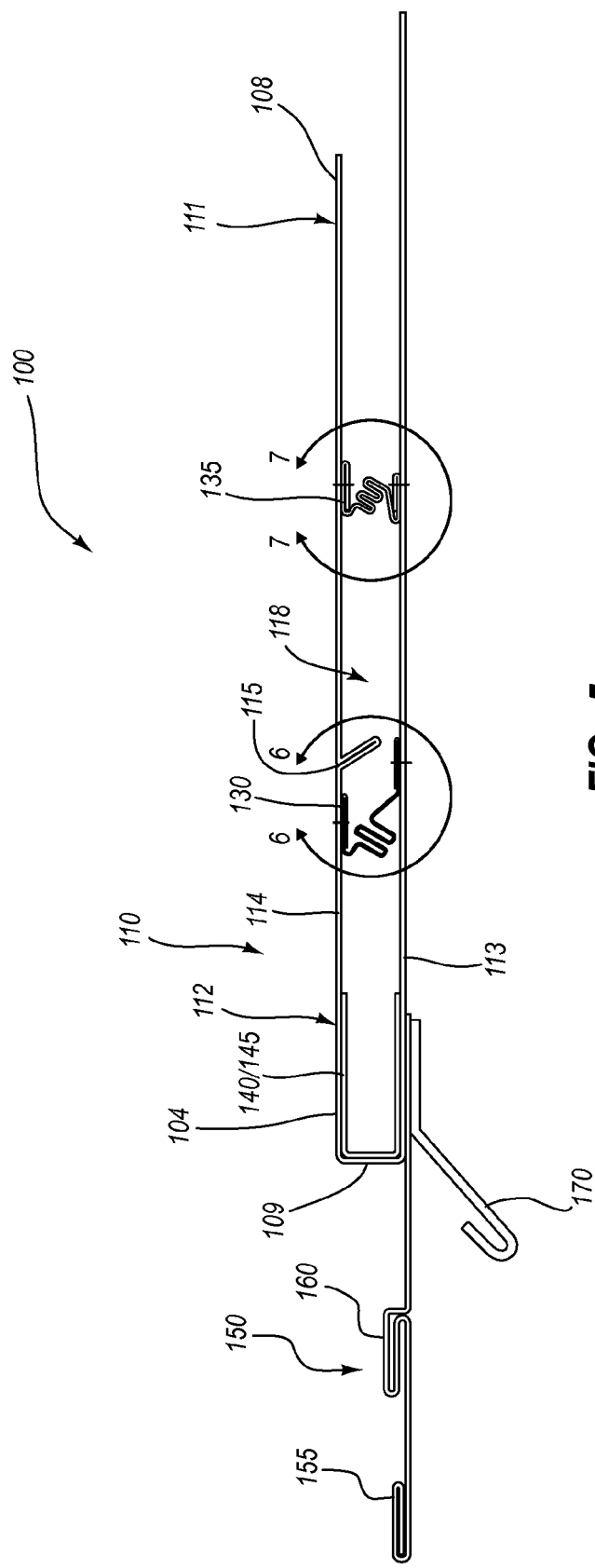
FIG. 5 is a side elevation view of the airbag assembly of FIG. 2.

FIG. 5 is a side elevation view of a portion of airbag assembly 100. As described herein, inflatable airbag cushion 110 comprises upper portion 111 and lower portion 112. Upper portion 111 comprises upper edge 108 that may be defined by the ends of front face 113 and rear face 114, or alternatively, the upper edge may be defined by a seam formed at the point at which the front face and the rear face are coupled. Lower portion 112 may comprise middle portion 104 at which fold 109 is formed, as well as one or more seam reinforcements 140, one or more heat panels 145, bag strap 150, and stabilizer strap 170.

First tether 130 and second tether 135 are each coupled to front face 113 and rear face 114 such that they are located within inflatable void 118. Forming pleat 115 in rear face 114 of the airbag cushion shortens the rear face, compared to the front face. As such, a top-most point 108 of rear face 114 is closer to bottom portion 112 of the airbag cushion, compared to a top-most point of front face 113. Bag strap 150 may comprise bag strap loop 160 and engagement portion 155. In the depicted embodiment, bag strap loop 160 comprises a fold or pleat of the bag strap material and engagement portion 155 comprises a roll or fold of the bag strap material. Stabilizer strap 170 may be coupled to cushion 110 at lower portion 112.

Figure 6:
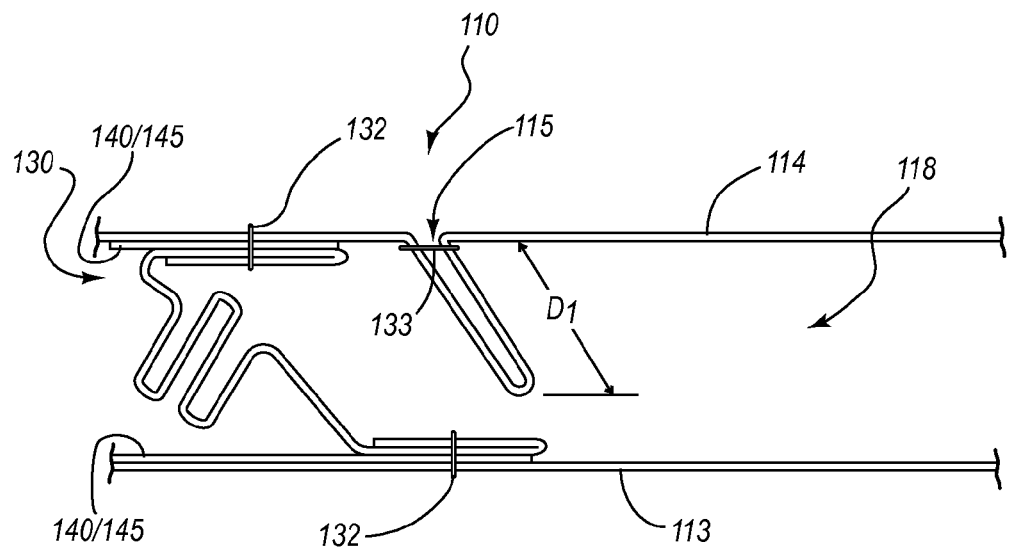
FIG. 6 is a close-up side elevation view of a portion of the airbag assembly of FIG. 2 taken along the view line 6-6 in FIG. 5.

FIG. 6 is a close-up side elevation view of a portion of inflatable airbag cushion 110, wherein pleat 115 and first tether 130 are visible. Pleat 115 may be formed by drawing together two points on rear face 114, and then coupling the two points together via stitching 133. For clarity, the two points are neither touching each other or located directly adjacent each other, because seam reinforcement material may be used such that the pleat does not rupture during airbag deployment. Pleat 115 may project from rear face 114 into inflatable void 118 in the direction of front face 113. A distance $D_1$ to which the pleat may project from the front face may be between about 20 mm and about 50 mm. First tether 130 has a first and second end, each of which may be rolled or folded before being coupled to front face 113 and rear face 114 of cushion 110. First tether 130 may be asymmetrically coupled to the front and rear faces such that a tether attachment point on front face 113 may be located further from an inflator (not shown) or inflator attachment area (not shown) than the point at which the tether is attached to rear face 114. Reinforcement and/or heat panel 140/145 may extend to first tether attachment points such that each of the first tether attachment points comprise 4 or more layers of material. First tether 130 may be coupled to cushion 110 via stitching 132.

Figure 7:
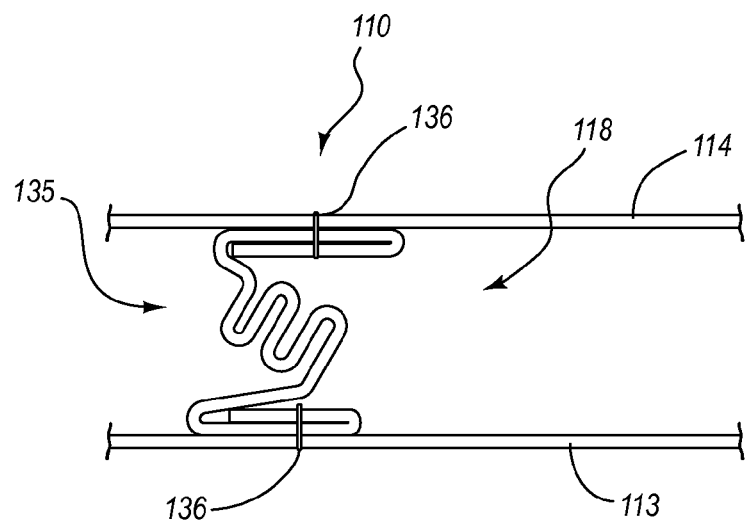
FIG. 7 is a close-up side elevation view of another portion of the airbag assembly of FIG. 2 taken along the view line 7-7 in FIG. 5.

FIG. 7 is a close-up side elevation view of a portion of inflatable airbag cushion 110, wherein second tether 135 is visible within inflatable void 118. Second tether 135 may be coupled to cushion 110 at two attachment points, wherein one attachment point is located on front face 113 and the other attachment point is located on rear face 114. In the depiction of FIG. 7, the two attachment points for the two tethers may be located approximately equal distances from an inflator. In another embodiment, the second tether 135 attachment point on front face 113 may be located closer to the inflator (not shown) than the rear face 114 attachment point, as depicted for first tether 130 in FIG. 6. Second tether 135 may be coupled to cushion 110 via stitching 136, wherein the stitching crosses 3 layers of material at each attachment point.

Figure 8A:
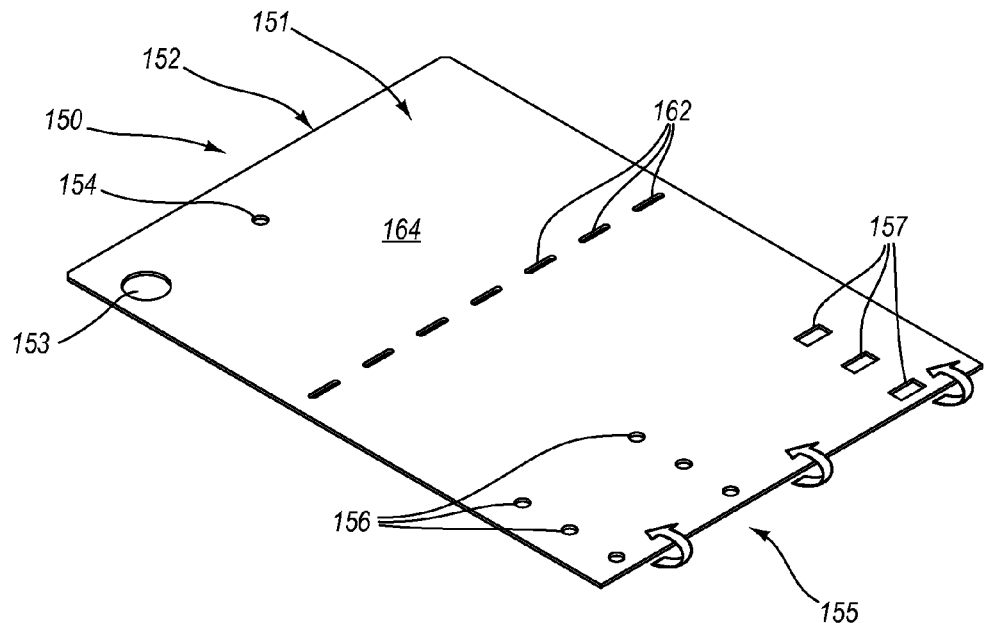
FIG. 8A is a perspective view of a panel of material from which a bag strap can be formed.
Figure 8B:
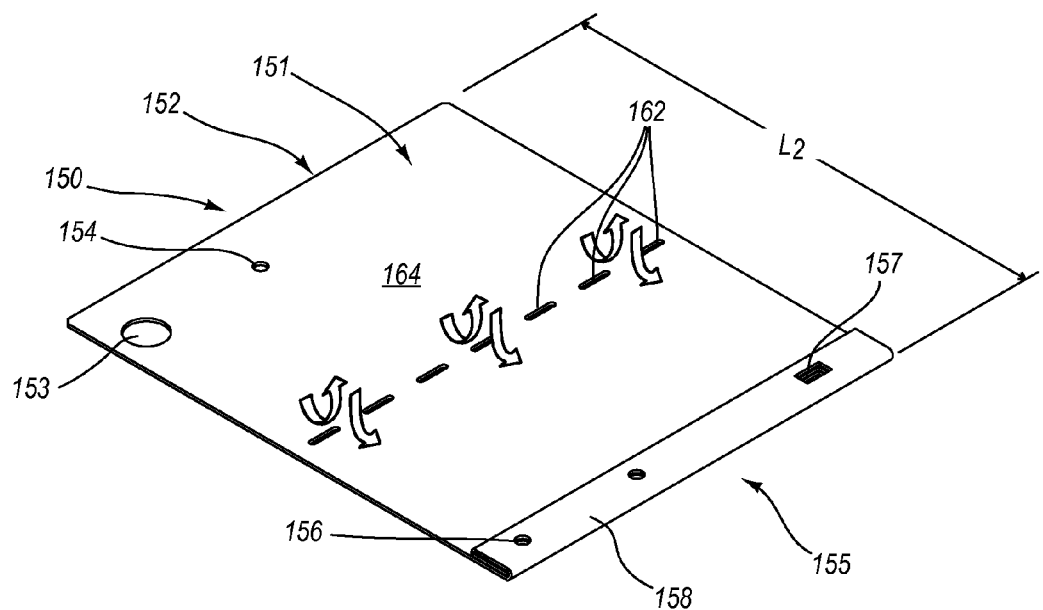
FIG. 8B is a perspective view of the panel of material of FIG. 8A after a portion of the panel has been folded.
Figure 8C:
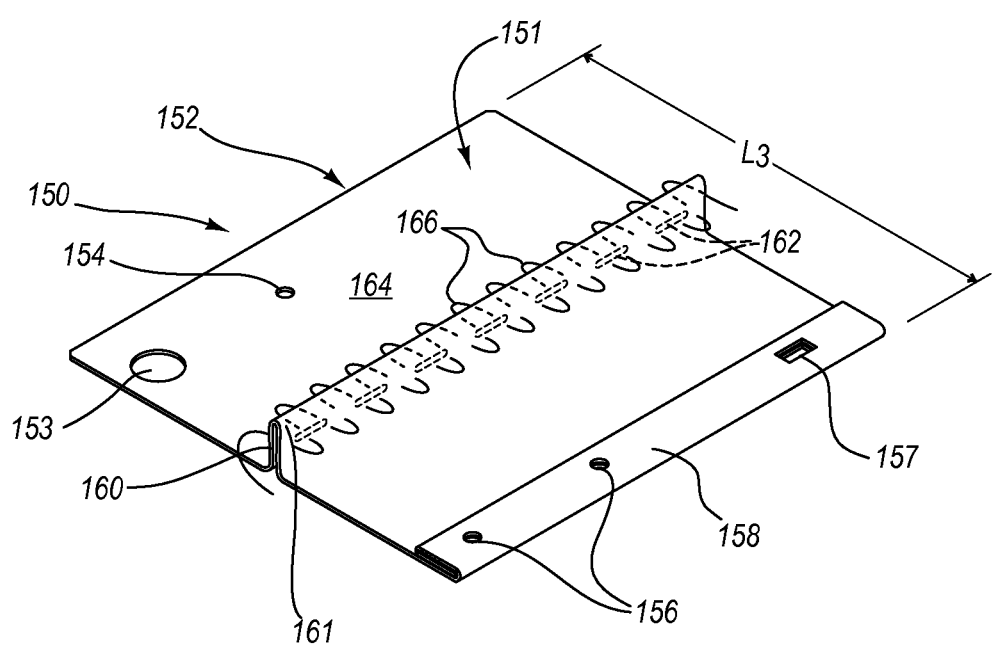
FIG. 8C is a perspective view of the panel of material of FIG. 8B after a loop has been formed in the panel of material.

FIGS. 8A-8C depict bag strap 150 from perspective views, wherein FIG. 8A depicts a full-length panel of material before it has been formed into a bag strap; FIG. 8B depicts the panel of material of FIG. 8A after a bottom portion of the bag strap has been rolled; and, FIG. 8C depicts the panel of material of FIG. 8B after the bag strap has had a loop formed in it. FIG. 8A depicts a panel of material 152 that has a predetermined length, and from which a bag strap may be formed. Panel 152 may comprise a piece of a woven nylon material similar to that which forms an inflatable airbag cushion. Panel 152 has a front face (not shown) and a rear face 164 and may comprise an airbag cushion portion 151, an inflator insert aperture 153, an inflator stem aperture 154, an engagement portion 155, engagement apertures 156, stabilizer strap apertures 157, and perforations 162. The apertures and perforations in panel 152 are formed in predetermined locations and may also be described as forming three horizontal rows of apertures and three vertical columns of apertures. The rows of apertures comprise apertures that have different functions, and the columns of apertures comprise apertures that have the same function.

FIG. 8B depicts panel 152 of FIG. 8A after engagement portion 155 has been rolled to form a rolled engagement portion 158. Rolled portion 158 is formed by folding a predetermined length of engagement portion 155 of panel 152 toward rear face 164 and in the direction of cushion portion 151. The distance of the fold is of such a magnitude that apertures 156 align with each other, and likewise, apertures 157 align with each other. After being folded, bag strap 150 has a shortened length, $L_2$. In another embodiment, the bag strap may not comprise a folded engagement portion. In such an embodiment, the panel of material from which the bag strap is formed may comprise two inflator stem apertures and one stabilizer strap aperture. FIG. 8B also depicts arrows that indicate the direction the panel of material may be folded to form a loop, which may be a step in a method for forming a bag strap.

FIG. 8C depicts panel 152 of FIG. 8B after a loop 160 has been formed such that the loop is located on rear face 164 and perforations 162 are incorporated within the loop. Loop 160 may also be described as a fold or a pleat in panel 152, from which bag strap 150 is formed. Loop 160 has an apex 161 that may also be described as a fold. Loop 160 may be retained via tear stitching 166 or any other suitable technique or structure. Tear stitching 166 is configured to rupture during inflatable airbag deployment. In one embodiment, the tear stitching includes, about 25 threads per 100 millimeters, although one skilled in the art will appreciate that other thread counts may similarly allow the rupture of tear stitching 166 during inflatable airbag deployment without damaging bag strap 150. Thus, tear stitching 166 is configured to rupture during deployment of the airbag cushion without damaging the bag strap and without retarding or altering cushion deployment.

In the depicted embodiment, tear stitch 166 runs across bag strap 150; however in other embodiments, the tear stitch may only be formed in a portion of the width of the bag strap or may define one or more light tack stitches. Tear stitch 166 and perforations 162 are configured to rupture during airbag cushion 110 deployment, such that the tear stitch ruptures before the perforations. Perforations 162 may be configured to allow bag strap 150 to become severed into two pieces during deployment. Perforations 162 are depicted as being located within bag strap loop 160; however, in alternative embodiments, the perforations may be located along different portions of the bag strap.

Panel 152 is of a predetermined length such that after the panel has been shortened by the formation of loop 160 and folded portion 158, the resulting bag strap is of a predetermined length $L_3$ that is shorter than the full length of the panel of material. The shortest length ($L_3$) of bag strap 150 can be called a wrapping length. The wrapping length is also shorter than a deployment length $L_2$ (depicted in FIG. 8B).

The wrapping length of the bag strap is configured to allow the bag strap to wrap around a rolled and/or folded inflatable airbag cushion and retain the cushion in this "packaged" or "folded" configuration. As discussed above, upon airbag deployment, the tear stitching that retains the bag strap in the wrapper length ruptures such that the bag strap adopts the deployment length. The deployment length of the bag strap is configured such that the airbag cushion can expand up to about 150 mm before it again begins to apply tension to the bag strap. As the airbag continues to expand, it is briefly retarded by the bag strap, until the perforations rupture and the airbag can continue to freely deploy.

Figure 9:
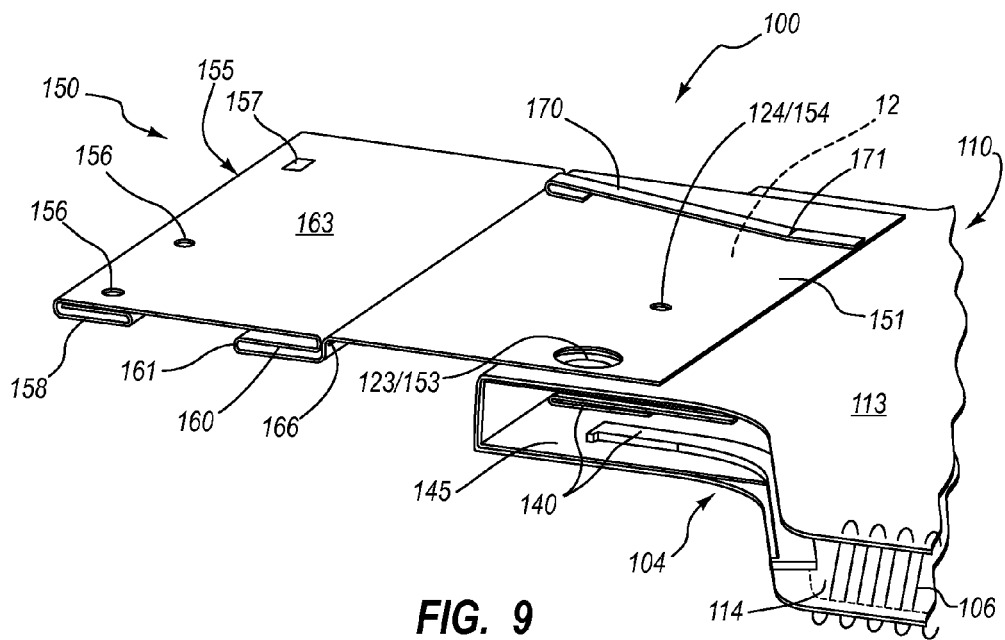
FIG. 9 is a close-up bottom perspective view of a portion of the airbag assembly of FIG. 2.
Figure 10:
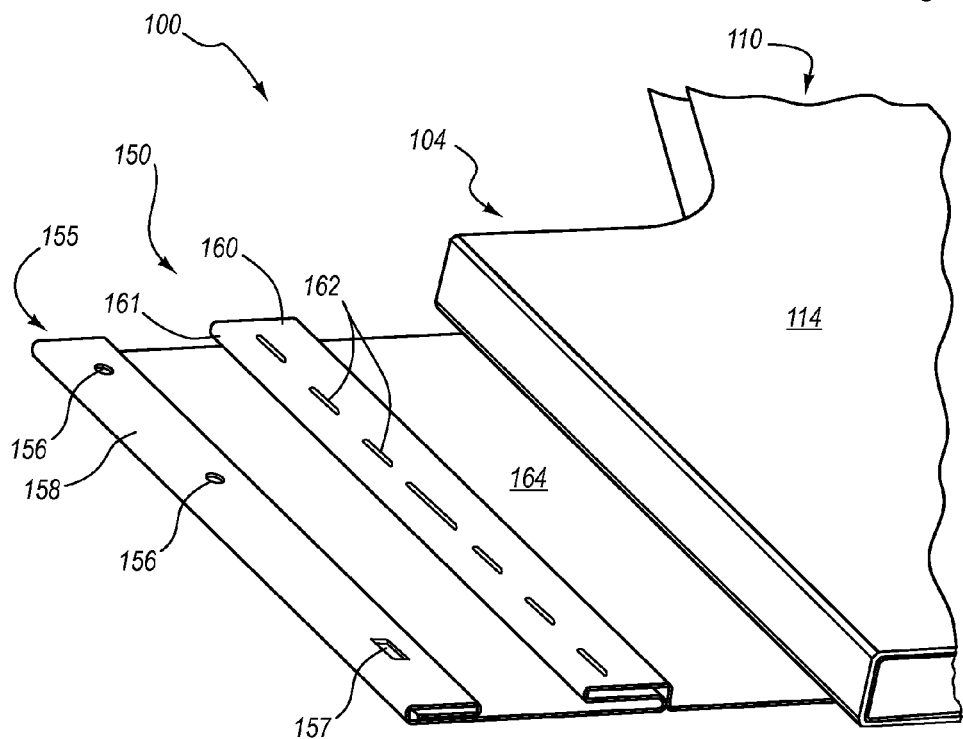
FIG. 10 is a close-up top perspective view of a portion of the airbag assembly of FIG. 2.

FIGS. 9-10 are close-up perspective views of a portion of airbag assembly 100, wherein FIG. 10 is rotated 180 degrees compared to the view of FIG. 9. As depicted in the figures, stitching 106 may be employed to couple front and rear faces 113 and 114. Reinforcement and/or heat shield 140/145 can be seen as being coupled to cushion 110 near middle portion 104. Bag strap 150 is coupled to front face 113. Inflator aperture 153 of the bag strap is in alignment with inflator aperture 123 of cushion 110, and likewise, inflator stem aperture 154 is aligned with inflator stem aperture 124 of the cushion. Bag strap loop 160, tear stitch 166, and perforations 162 are located between cushion portion 151 of bag strap 150 wherein the bag strap is coupled to cushion 110 and an engagement portion 155 of bag strap 150. Loop 160 is configured such that it extends away from front face 163. In other words, an apex 161 of loop 160 extends from rear face 164 because the loop is formed on the rear face. Engagement portion 155 may comprise a folded engagement portion 158, inflator mounting stem engagement apertures 156, and stabilizer strap aperture 157.

Stabilizer strap 170 may comprise a piece of webbing that is about 10 mm wide and is coupled to bag strap 150 and cushion 110 on front face 113, near middle portion 104. Stabilizer strap 170 may be coupled to cushion 110 via stitching 171, such that the stitching is aligned with the centers of the inflator insert apertures 123/153 and inflator stem apertures 124/154. In the depicted embodiment, stitching 171 comprises a single line of stitching; however, in another embodiment, the stitching may comprise a box stitch. If a box stitch is employed, the portion of the box stitch that is closed to the inflator or attachment area 120 of cushion 110 may be aligned with the centers of inflator apertures 123/153 and 124/154.

Inflatable airbag cushion 110 may be configured into a packaged configuration by employing a method for folding an airbag cushion, wherein the method may comprise obtaining an airbag cushion membrane as disclosed herein, tucking the sides of the cushion in toward the center until a width of the cushion is less than a width of an airbag housing to which the cushion may be attached; applying an optional tack or tear stitch; reverse rolling or reverse folding the tucked top portion of the cushion one time; continuing to reverse roll or reverse fold the tucked top portion; wrapping a bag strap around the folded cushion; securing the bag strap to at least one inflator mounting stem. In one embodiment, the folding method results in an airbag cushion that has been rolled or folded up to 5 times.

FIGS. 11A-14 depict various views of airbag cushion assembly 100 during and after steps in a method for packaging an inflatable airbag cushion have been performed. FIGS. 11A-11C are front elevation views of assembly 100, wherein FIG. 11A depicts the assembly in a pre-packaging configuration, FIG. 11B depicts the assembly after a first step in the method for packing an airbag cushion has been performed, and FIG. 11C depicts the assembly after another step has been performed. In the views of FIGS. 11A-11C, various structures and features of assembly 100 are visible, including cushion 110, which has upper and lower portions 111 and 112, rear face 114, a first half 116, a second half 117, inflator insert aperture 123, and inflator mounting stem aperture 124; and bag strap 150, which has cushion portion 151, engagement portion 155, inflator mounting stem engagement apertures 156, stabilizer strap aperture 157, rolled portion 158, loop 160, perforations 162, and rear face 164.

In the depiction of FIG. 11A, assembly 110 is in a flattened configuration, wherein any wrinkles or folds in cushion 110 have been removed and rear faces 114 and 164 can be said to be facing "up." It can be said that providing an inflatable airbag cushion and flattening the cushion comprise first steps in a method for folding or packaging an inflatable airbag cushion.

FIG. 11B depicts cushion 110 after first and second halves 116 and 117 have been tucked in towards a midline of cushion 110. The tucks may be performed by pushing each half of the cushion into the cushion, "outside-in." In other words, first and second halves of the airbag cushion are each tucked into a middle portion of the airbag cushion such that the front and rear faces of each of the first and second halves are positioned in between the upper and lower panels of the middle portion. After the tucking steps have been performed, cushion 110 comprises a tucked upper portion 119.

FIG. 11C depicts cushion 110 after a tucked upper portion 119 of cushion 100 is folded one time in the direction of rear face 114, away from front face 113. As such, tucked upper portion 119 is folded downward toward lower portion 112 and bag strap 150.

Figure 12A:
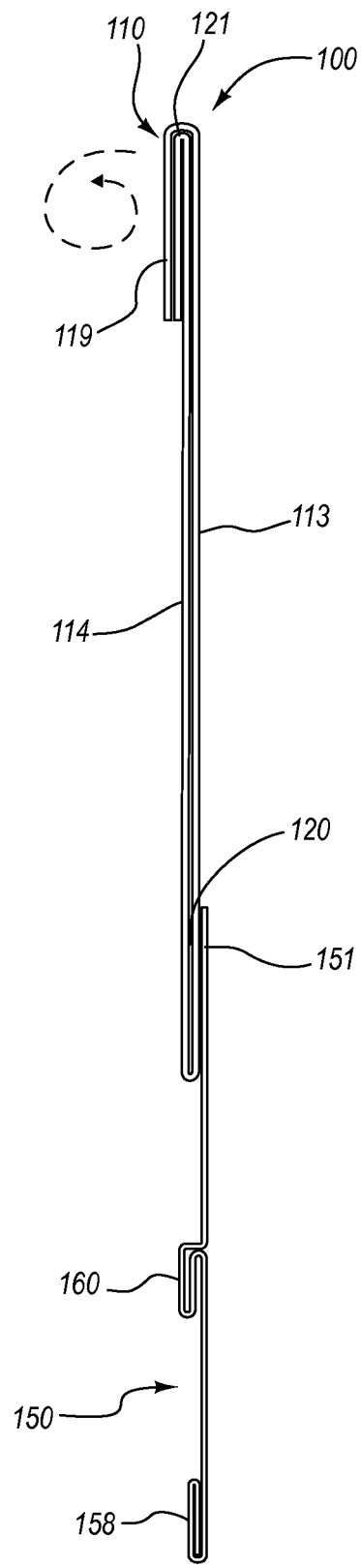
FIG. 12A is a side elevation view of the airbag cushion assembly of FIG. 11C.

FIGS. 12A-12D depict airbag assembly 100 from a side elevation view, wherein the assembly is being subjected to steps in a method for packaging an inflatable airbag cushion. Visible in the figures are cushion 110, which has front face 113, rear face 114, attachment area 120, and bag strap 150, which has cushion portion 151, folded engagement portion 158, and loop 160. FIG. 12A is a side elevation view that depicts assembly 100, wherein the assembly is at the same stage of packaging as depicted in FIG. 11C. Upper tucked portion 119 has been folded one time toward rear face 114, in the direction of bag strap 150, such that a fold 121 has been formed.

Figure 12B:
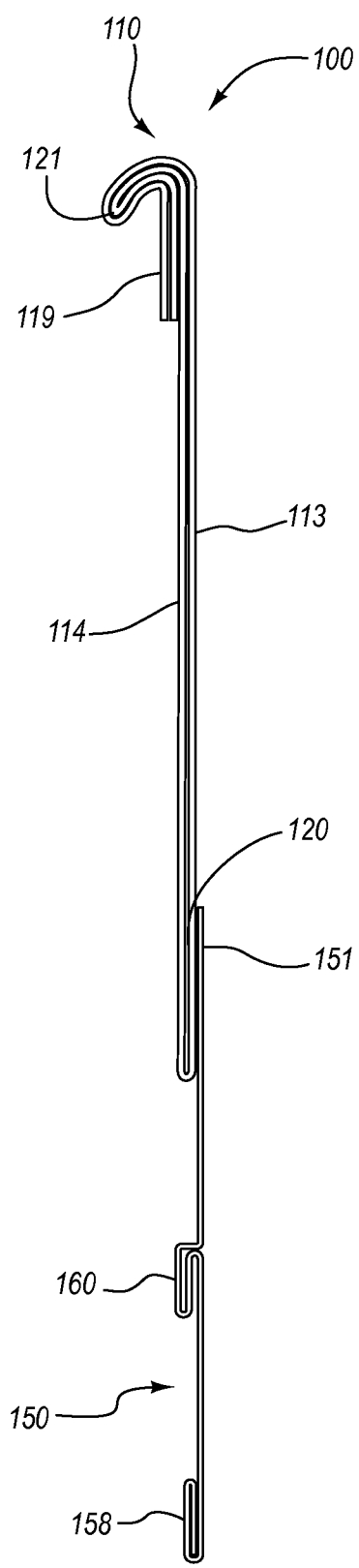
FIG. 12B is a side elevation view of the airbag cushion assembly of FIG. 12A after a top portion of the airbag cushion has begun to be rolled in accordance with a method for folding an airbag cushion.

FIG. 12B depicts the airbag assembly 100 of FIG. 12A after fold 121 of upper tucked portion 119 has begun to be rolled in the direction of rear face 114. Since the roll is made in the direction of the rear face, it may be described as being a "reverse" roll. In another embodiment, the airbag cushion may be folded, instead of rolled. However, it will be noted that as consecutive folds are made, they may begin to resemble rolls.

Figure 12C:
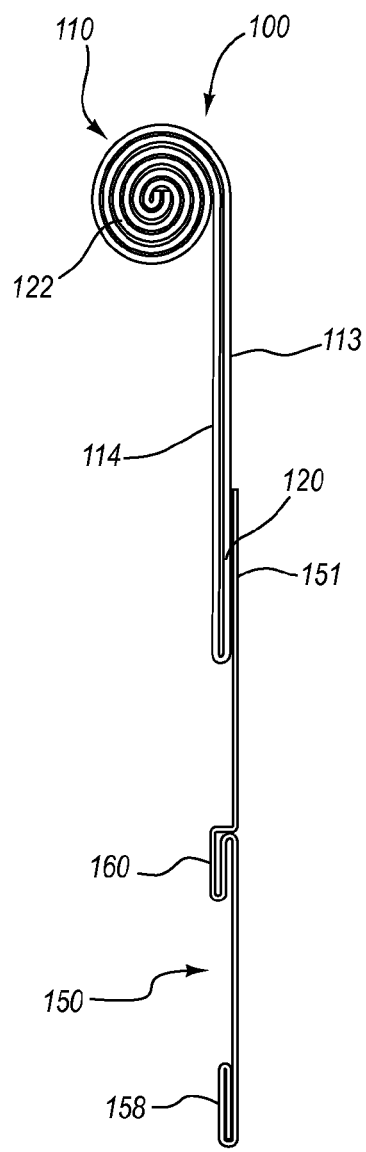
FIG. 12C is a side elevation view of the airbag cushion assembly of FIG. 12B, wherein the airbag cushion has continued to be rolled in accordance with a method for folding an airbag cushion.
Figure 12D:
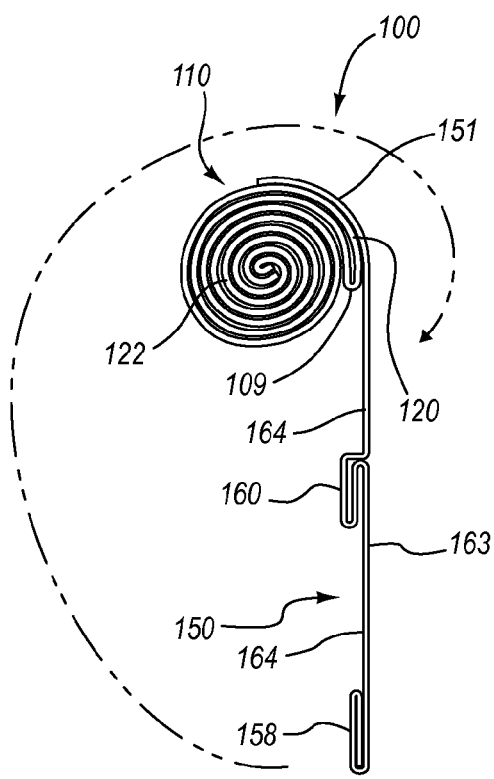
FIG. 12D is a side elevation view of the airbag cushion assembly of FIG. 12C after the top portion of the airbag cushion has been rolled in accordance with a method for folding an airbag cushion.

FIGS. 12C-12D depict the airbag assembly 100 of FIG. 12B after the folded portion of the upper tucked portion of the airbag cushion has continued to be rolled towards rear face 114 in the direction of bag strap 150. As cushion 110 is rolled, the cushion comprises a rolled inflatable airbag cushion 122. As noted previously, attachment area 120 is located on front face 113 of cushion 110, and bag strap 150 is coupled to the cushion at cushion portion 151 of the bag strap. Cushion 110 may continue to be rolled in the direction of bag strap 150 until rolled cushion 122 is rolled to fold 109 of the cushion. As such, cushion portion 151 of bag strap 150 may be partially rolled with the cushion. A next step in the packaging method disclosed herein may comprise wrapping bag strap 150 around cushion 110 such that rear face 164 of the bag strap is on the inside of the wrap and front face 163 is on the outside of the packaged airbag assembly.

FIGS. 13A-13B depict airbag cushion assembly 100 from front elevation views. Visible in the figures are cushion 110, and bag strap 150 that has cushion portion 151, inflator insert aperture 153, inflator stem aperture 154, inflator engagement apertures 156, strap aperture 157, folded engagement portion 158, loop 160, perforations 162, front face 163, rear face 164, and tear stitching 166.

In the depiction of FIG. 13A the assembly is at the same stage of packaging as depicted in FIG. 12D. Cushion 110 has been rolled such that it comprises a rolled cushion 122 and rear face 164 of bag strap 150 is positioned such that it can be wrapped around the rolled airbag cushion. As noted herein, inflator insert aperture 153 is aligned with cushion 110 inflator insert aperture 123 and inflator mounting stem aperture 154 is aligned with inflator mounting stem aperture 124.

FIG. 13B depicts a next step in the method for packaging the airbag cushion, which may comprise wrapping bag strap 150 around rolled cushion 122 such that inflator stem engagement apertures 156 are aligned with inflator insert apertures 123/153 and inflator mounting stem apertures 124/154. Since the rear face of bag strap 150 is on the inside of the packaged airbag cushion, front face 163 is visible. If an optional stabilizer strap is present, it may protrude through strap aperture 157. Prior to completing rolling cushion 110, an inflator may be inserted in cushion 110 such that the inflator mounting stems protrude through apertures 123/153, and apertures 156, which are located in the folded engagement portion 158 of bag strap 150. The length of bag strap 150 is configured such that loop 160 is located at a predetermined position on rolled cushion 122. Since loop 160 is located at a predetermined location, perforations 162 and tear stitching 166 are also located at predetermined locations on rolled cushion 122.

FIG. 14 depicts a portion of airbag assembly 100 from a side elevation view after cushion 110 has been placed in a rolled configuration 122, the rolled cushion has been wrapped by bag strap 150, and an inflator 180 has been inserted into the cushion. Attachment area 120 of cushion 110 is the area to which inflator 180 can be attached as well as the area to which cushion portion 151 of the bag strap is coupled. In the packaged configuration, folded engagement portion 158 is adjacent to cushion portion 151, rear face 164 is adjacent to the wrapped cushion 122, and front face 163 is located on the outside of the packaged airbag assembly. First inflator mounting stem 182 and second inflator mounting stem (not visible) may protrude through cushion 110 attachment area 120, bag strap 150 cushion portion 151, and folded engagement portion 158. Bag strap loop 160 is located at a predetermined location on cushion 110, and the loop is oriented such that the apex 161 of the loop is between the bag strap and the cushion.

Figure 15:
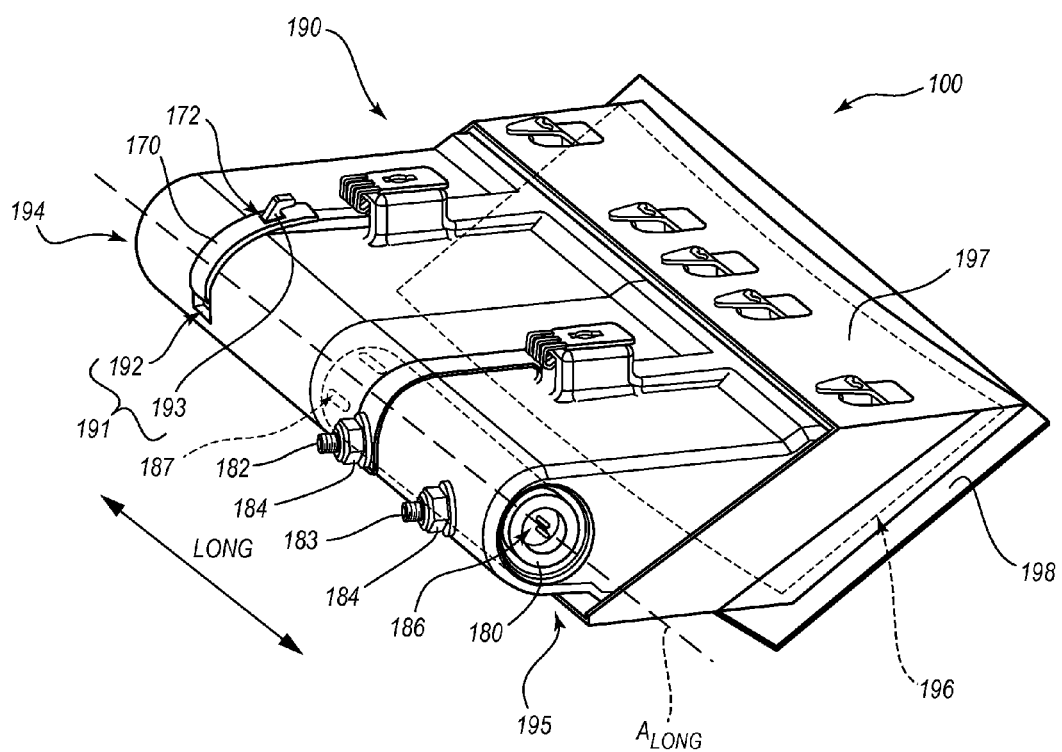
FIG. 15 is a rear perspective view of an airbag housing into which a packaged airbag assembly of FIG. 2 has been placed.

FIG. 15 is a perspective view of airbag assembly 100 after the airbag cushion 110 has been folded and/or rolled into a folded or packaged configuration, wrapped by the bag strap, and placed into an airbag housing 190. Although the airbag cushion 110 is in a format such as that shown in FIGS. 13B and 14 when within the housing 190, the airbag cushion 110 is not illustrated at an interior of the housing 190 in FIG. 15 for the sake of clarity and convenience. Housing 190 can comprise any suitable material, such as metal and/or plastic, and can define a container to which the inflatable airbag cushion may be fixedly attached. Housing 190 is configured to be mounted within a vehicle, and can be used in positioning the airbag assembly 100 so that the inflatable cushion 110 may deploy with predetermined characteristics. For example, the housing 190 can define a deployment opening 196 through which the inflatable airbag cushion 110 can be deployed. In the illustrated embodiment, the deployment opening 196 is at a forward end of the housing 190 and is elongated in a longitudinal direction (represented by the arrow labeled "LONG"), which can correspond with a transverse direction of a vehicle when the assembly 100 is mounted in the vehicle. The deployment opening 196 is at a forward end of the housing 190 and is sloped rearwardly in the downward direction. In at least an initial phase of deployment, the inflatable airbag cushion 110 can deploy outwardly from the housing 190 through the deployment opening 196 toward a vehicle occupant in a direction that is substantially perpendicular to the lateral direction of the vehicle.

The housing 190 can be elongated in the longitudinal direction and can define a longitudinal axis $A_{LONG}$ that extends between a first lateral end 194 and a second lateral end 195 of the housing 190. In the illustrated embodiment, a longitudinal axis defined by the inflator 180 is collinear with the longitudinal axis $A_{LONG}$. In other embodiments, the longitudinal axis of the inflator 180 can be offset relative to the longitudinal axis $A_{LONG}$ so as to be parallel thereto. In other embodiments, the longitudinal axis of the inflator 180 can be angled and/or offset relative to the longitudinal axis $A_{LONG}$.

In the illustrated embodiment, the housing 190 defines an opening in the second lateral end 195 through which a portion of the inflator 180 can extend and/or otherwise be readily accessible from an exterior of the housing 190. The exposed end of the inflator 180 can include an initiator 186 portion of the inflator 180. The exposed initiator 186 can permit a lead wire assembly to be readily coupled with the initiator during manufacture of the assembly 100 and/or installation of the assembly 100 in a vehicle.

In some embodiments, the housing 190 is coupled with a cover piece 197 of any suitable variety. The cover piece 197 can span or otherwise cover the deployment opening 196 of the housing 190. In the illustrated embodiment, the cover piece 197 includes a cover 198 that can be readily opened as the inflatable airbag cushion 110 is deployed, as is known in the art. For example, in some embodiments, the cover 198 can include a weakened area and can be configured to tear or burst to permit the airbag cushion 110 to pass through it. In other embodiments, the cover 198 can be hinged so as to swing open and thereby permit the airbag cushion 110 to pass by it.

As previously discussed, a portion of the inflator 180 can be inserted into the inflatable void 118 of the airbag cushion 110. The inflator 180 can further be coupled with the housing 190. Accordingly, as further discussed hereafter with respect to other embodiments, the inflatable airbag cushion 110 can be coupled to the housing 190 via the inflator 180. For example, in the illustrated embodiment, the housing 190 defines a plurality of apertures (not visible) through which the first and second inflator mounting stems 182 and 183 can protrude. Moreover, the inflator mounting stem 182 can extend through the inflator mounting stem aperture 124 of the inflatable airbag cushion 110 (see, e.g., FIG. 9), and the inflator mounting stem 183 can be positioned at the inflator insert aperture 123 (see, e.g., FIG. 9). As shown in FIG. 15, the first and second inflator mounting stems 182 and 183 may receive mounting hardware 184 (e.g., bolts), such that the inflator 180 and inflatable cushion 110 may be fixedly coupled to the housing 190. The housing 190 may be fixedly coupled to a vehicle structure.

The housing 190 can define a retaining component or mounting component 191, which fixes the stabilizer strap 170 relative to the housing 190 and/or retains a portion of the stabilizer strap 170 at an exterior of the housing 190 during deployment of the inflatable airbag cushion 110. In the illustrated embodiment, the mounting component 191 comprises a stabilizer strap aperture 192, which may also be referred to as a stabilizer opening or aperture, that extends through the housing 190. The mounting component 191 further comprises a catch 193. Any suitable arrangement of the catch 193 is contemplated. In the illustrated embodiment, the catch 193 comprises a hook that projects outwardly from an external upper surface of the housing 190 and also extends forwardly. A portion of the stabilizer strap 170 extends rearwardly from the interior of the housing through the stabilizer strap aperture 192, is wrapped around a rearward end of the housing 190 toward a forward end of the housing 190, and is retained on the catch 193. In the illustrated embodiment, the stabilizer strap 170 defines a mounting aperture 172 that is advanced over the catch 193, or stated otherwise, the catch 193 extends through the mounting aperture 172 of the stabilizer strap 170. Accordingly, at least a portion of the stabilizer strap 170 may be said to encompass or extend about the catch 193 so as to fixedly attach the stabilizer strap 170 to the housing 190.

When the inflatable airbag cushion 110 is deployed, the catch 193 retains a portion of the stabilizer strap 170 at an exterior of the housing 190. Accordingly, the portion of the stabilizer strap 170 that is attached to the airbag cushion 110 is retained in a generally fixed relationship relative to the housing 190. In some embodiments, this portion of the airbag cushion 110 may be within the housing 190 when the airbag cushion 110 is fully deployed, such that the stabilizer strap 170 retains the portion of the airbag cushion 110 to which it is attached at the interior of the housing 190. In other embodiments, the portion of the airbag cushion 110 to which the stabilizer strap 170 is attached may in fact exit the housing 190 through the deployment opening 196 before being retained in place by the stabilizer strap 170. In such instances, a portion of the airbag cushion 110 that is rearward of the attachment point on the cushion 110 can be maintained within the housing 190 due to the restraint provided by the stabilizer strap 170. In either attachment scenario, the stabilizer strap 170 can serve to retain at least a portion of the airbag cushion 110 within the housing 190. Moreover, in either attachment scenario, the stabilizer strap 170 serves to maintain a portion of the airbag cushion 110 in fixed relationship relative to the housing 190 during at least the latter stages of deployment of the airbag cushion 110.

In the illustrated embodiment, the catch 193 and the stabilizer aperture 192 are at approximately the same longitudinal position of the housing 190, with the catch 193 being forward of the stabilizer aperture 192. The catch 193 is at an upper end of the housing 190, whereas the aperture 192 is at a rearward end of the housing 190. The stabilizer aperture 192 can restrict movement of the stabilizer strap 170 further to the restriction provided by the catch 193. For example, location of the stabilizer aperture 192 and the catch 193 at different sides or ends of the housing 190 can cause the stabilizer strap 170 to extend about and frictionally engage the upper side of the stabilizer aperture 192. When the stabilizer strap 170 is under tension, such as at latter stages of deployment of the airbag cushion 110, the frictional engagement can prevent movement of the stabilizer strap 170 in the longitudinal direction. Moreover, the lateral side edges of the stabilizer aperture 192 likewise can prevent movement of the stabilizer strap 170 in the longitudinal direction. In the illustrated embodiment, longitudinal movement of the stabilizer strap 170 may be minimal in any event, as the alignment of the stabilizer aperture 192 and the catch 193 along a direction in which the airbag cushion 110 is deployed through the deployment opening 196 can generally directly counteract the forces that would tend to move the airbag cushion 110 out of the housing 190 at the latter stages of deployment.

Other suitable arrangements for the mounting component 191 are possible. For example, in some embodiments, the mounting component 191 comprises the stabilizer aperture 192 through which the stabilizer strap 170 can extend, and can further include a tab, an aperture for receiving mounting hardware (as well as the mounting hardware itself), a linear extension, or any other suitable arrangement for retaining the stabilizer strap 170 in fixed relation relative to the housing 190. In some embodiments, the stabilizer aperture 192 and the catch 193 are not aligned along a direction of initial deployment of the airbag cushion 110. In still other embodiments, the mounting component 191 may include only a stabilizer aperture 192, which may be shaped differently from that shown in FIG. 15, as discussed further below with respect to FIGS. 22-26.

The inflator 180 can be configured to be activated in response to predetermined vehicle conditions as detected or otherwise determined by vehicle sensors. Upon activation, the inflator 180 rapidly generates or releases inflation gas, which forces the airbag cushion 110 through the cover 198 and rapidly inflates the cushion 110. The inflator 180 may be of any suitable variety, such as pyrotechnic, stored gas, or a combination inflator. Additionally, the inflator 180 may comprise a single or multistage inflator. As will be appreciated by those skilled in the art, one or more vehicle sensors of a variety of types and configurations can be utilized to configure a set of predetermined conditions that will dictate whether the inflator 180 is activated. For example, in one embodiment, a seat rail sensor is utilized to detect how close or far away from an airbag deployment surface an occupant's seat is positioned. In another embodiment, a seat scale may be used to determine whether an occupant is occupying the seat and if so, ascertain an approximate weight of the occupant. In yet another embodiment, an optical or infrared sensor may be used to determine an occupant's approximate surface area and/or distance from an airbag deployment surface. In another embodiment, an accelerometer is employed to measure the magnitude of negative acceleration experienced by a vehicle, which may indicate whether an accident has occurred and the severity of the accident. Additionally, any suitable combination of these and/or other suitable sensor types may be used.

The inflator 180 can define openings 187 through which inflation gases exit the inflator 180 so as to inflate the inflatable airbag cushion 110. In the illustrated embodiment, the openings 187 are at an end of the inflator 180 that is opposite of the initiator end 186. The openings 187 can be at an intermediate position between the lateral ends 194, 195 of the housing 195. For example, the openings 187 can be no greater than about ¼, ⅓, ½, or ⅔ the distance from the second lateral end 195 to the first lateral end 194. The inflation gases thus can be introduced into the inflatable void 118 of the inflatable airbag cushion 110 at an intermediate lateral position at a rearward end of the cushion 110.

Stated otherwise, the inflator 180 may not extend a full distance between the lateral ends 194, 195 of the housing 180. Accordingly, although a portion of the airbag cushion 110 may be mounted to the housing 190 via the inflator 180, the inflator 180 does not secure the airbag cushion 110 to the housing 190 along a full longitudinal extent of the housing 190. As discussed further below, such an arrangement could result in skewing of the airbag cushion 110 at latter stages of the inflation thereof, in the absence of the stabilizer strap 170 and the associated mounting component 191 of the housing 190. In the illustrated embodiment, the inflator 180 is coupled to the housing 190 at a position that is closer to the second lateral end 195 of the housing 190, and the mounting component 191 is closer to the first lateral end 194 of the housing 190. As previously discussed, such an offset position of the inflator 180 can facilitate access to the initiator 186 or electrical contacts of the inflator 180.

During the initial stages of deployment of the airbag cushion 110, pressure provided by the inflation gases can be sufficient to maintain the full rearward end of the airbag cushion 110 against an interior surface of the rearward end of the housing 190. However, as the airbag cushion 110 is fully inflated, with greater amounts of the airbag cushion 110 at an exterior of the housing and some or all of the airbag cushion 110 being in tension, the airbag cushion 110 can have a tendency to pull away from the housing 190. In the absence of the stabilizer strap 170 and the associated mounting component 191 of the housing 190, such pulling away of the airbag cushion 110 could skew and rotate the airbag cushion, since it would only be attached to a portion of the longitudinal extent of the housing 190 via the inflator 180 mounting structures (see FIG. 26 and associated discussion). The stabilizer strap 170 can counteract such skewing and rotational forces.

FIGS. 16-20 are various views of portions of another embodiment of an inflatable cushion airbag assembly 200, wherein the figures depict structures used in a method for coupling an inflator 280 to an airbag cushion membrane 210 and airbag housing 290. The figures also depict a stabilizer strap 270 that aids the cushion in achieving predetermined deployment characteristics. Inflatable cushion airbag assembly 200 can resemble the airbag assembly 100 described above in certain respects. Accordingly, like features are designated with like reference numerals, with the leading digits incremented to "2." Relevant disclosure set forth above regarding similarly identified features thus may not be repeated hereafter. Moreover, specific features of the airbag assembly 200 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 200. Any suitable combination of the features and variations of the same described with respect to the airbag assembly 100 can be employed with the airbag assembly 200, and vice versa.

Figure 16:
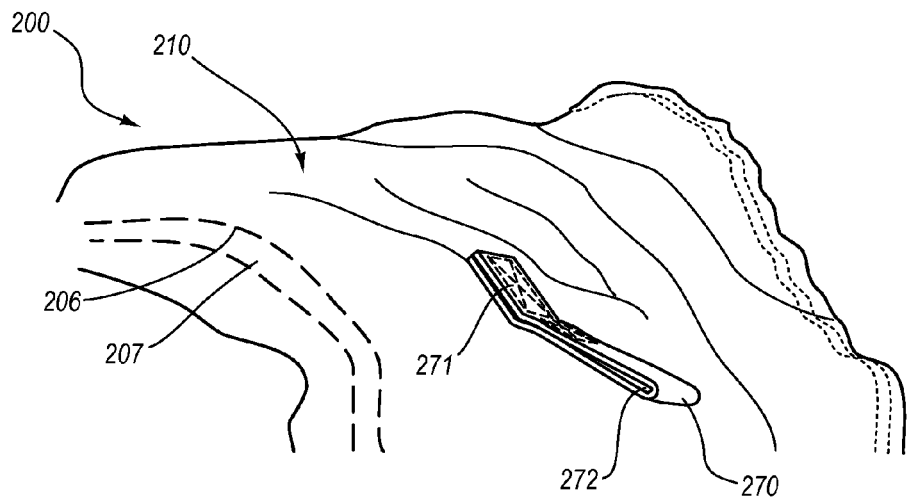
FIG. 16 is a close-up cutaway perspective view of a portion of another embodiment of an inflatable cushion airbag assembly.

FIG. 16 is a close-up cutaway, perspective view of a portion of inflatable cushion airbag assembly 200. Inflatable cushion membrane 210 may be configured like cushion membrane 110, described herein, or cushion 210 may be configured differently. Cushion 210 defines and inflatable void that is formed by a seam 207 that comprises stitching 206. Cushion 210 may comprise a stabilizer strap 270 that is formed by a loop of nylon webbing that defines a mounting aperture 272. Strap 270 may be about 10 mm wide and has a predetermined length. Stitching 271 may be employed to couple strap 270 to cushion 210.

Figure 17:
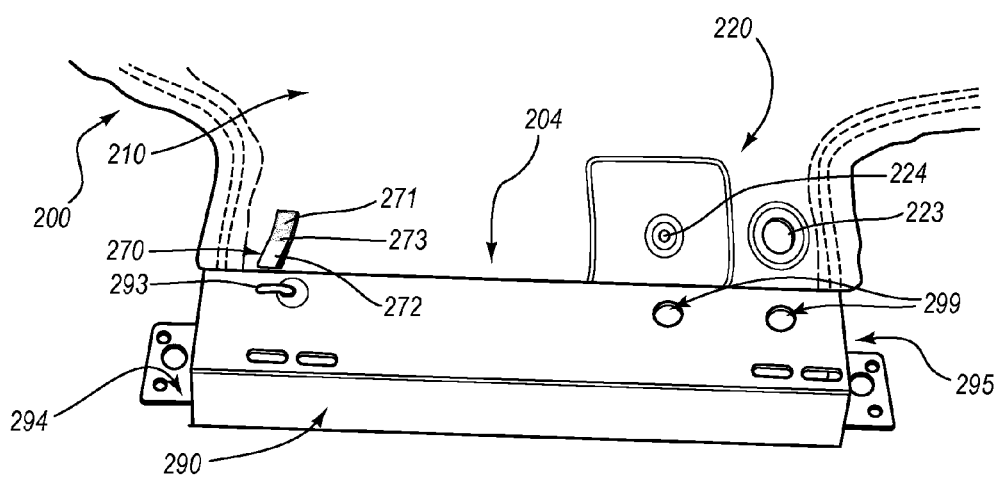
FIG. 17 is a rear perspective view of a portion of the airbag assembly of FIG. 16.

FIG. 17 is a rear perspective view of airbag assembly 200 at an intermediate stage of manufacture, wherein airbag cushion 210 is located adjacent to housing 290 prior to the cushion being coupled to the housing 290. The housing 290 can define a cavity that faces downward in the orientation shown in FIG. 17. Accordingly, the airbag cushion 210 is shown adjacent to a front sidewall (not shown in FIG. 17; see FIG. 18) of the housing 290 in FIG. 17. Cushion 210 comprises a folded middle portion 204, an inflator attachment area 220, an inflator insert aperture 223, and an inflator stem aperture 224. Strap 270 may be positioned on cushion 210 such that a lowest portion 273 of stitching 271 is aligned with the centers of apertures 223 and 224. Mounting aperture 272 of strap 270 is configured to be received by a catch 293 located on the housing 290, as discussed further below with respect to FIG. 18. In the illustrated embodiment, the catch 293 comprises a hook that extends outwardly from an exterior surface of the housing and extends generally in the longitudinal direction. Housing 290 also comprises apertures 299 that are configured to receive inflator mounting stems.

Figure 18:
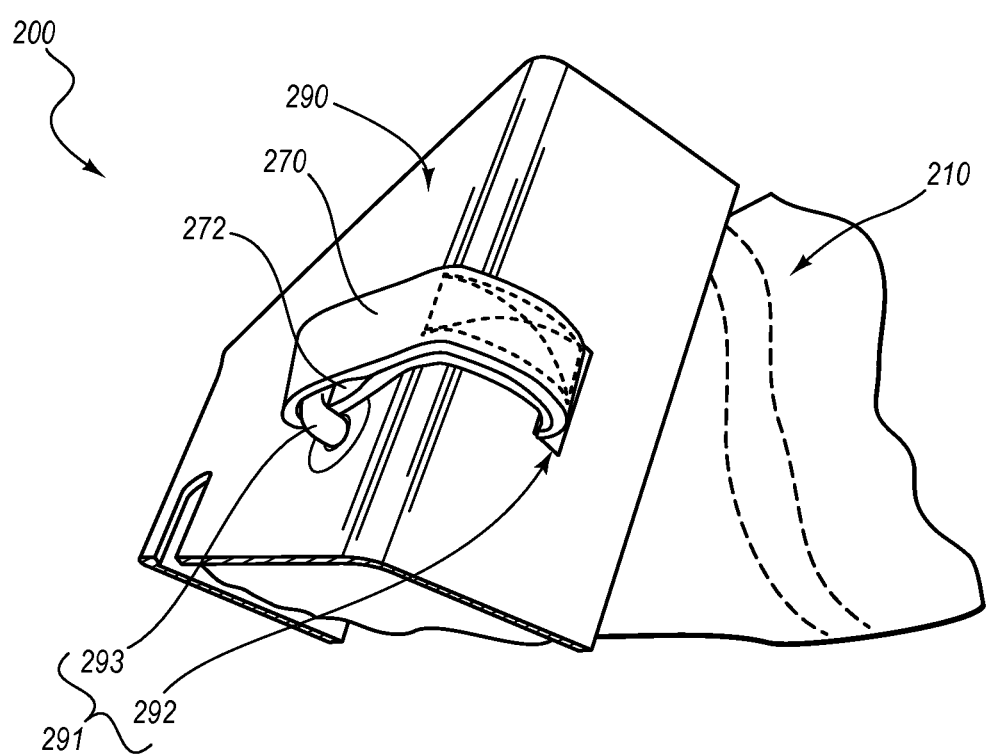
FIG. 18 is a close-up cutaway front perspective view of a portion of the inflatable cushion airbag assembly of FIG. 17 after another step in a method for attaching an inflator has been performed.

FIG. 18 is a close-up cutaway front perspective view of assembly 200 in which a stabilizer strap aperture 292 of the housing 290 is visible. The stabilizer strap aperture 292 may also be referred to as a stabilizer opening or aperture or as a strap aperture. Stabilizer strap 270 protrudes forwardly through strap aperture 292 and is wrapped around a forward end of the housing 290 so as to extend rearwardly to the catch 293. The strap mounting aperture 272 is configured to fit over and be retained by catch 293.

Stated otherwise, with reference to FIGS. 17 and 18, the housing 290 defines an attachment component 291, which includes the stabilizer aperture 292 and the catch 293. The stabilizer aperture 292 is at a forward end of the housing 290. The catch 293 extends outwardly from an upper surface of the housing 290. A portion of the stabilizer strap 270 extends forwardly from the interior of the housing through the stabilizer strap aperture 292 and is retained on the catch 293. The mounting aperture 272 is advanced over the catch 293, or stated otherwise, the catch 293 extends through the mounting aperture 272. Accordingly, at least a portion of the stabilizer strap 270 may be said to extend about or encompass the catch 293 so as to fixedly attach the stabilizer strap 270 to the housing 290.

When the inflatable airbag cushion 210 is deployed, the catch 293 retains a portion of the stabilizer strap 270 at an exterior of the housing 290. Accordingly, the portion of the stabilizer strap 270 that is attached to the airbag cushion 210 is retained in a generally fixed relationship relative to the housing 290.

In the illustrated embodiment, the catch 293 and the stabilizer aperture 292 are at approximately the same longitudinal position of the housing 290, with the stabilizer aperture 292 being forward of the catch 293. The catch 293 is at an upper end of the housing 290, whereas the aperture 292 is at a forward end of the housing 290. The stabilizer aperture 292 can restrict movement of the stabilizer strap 270 further to the restriction provided by the catch 293. For example, location of the stabilizer aperture 292 and the catch 293 at different sides or ends of the housing 290 can cause the stabilizer strap 270 to extend about and frictionally engage the upper side of the stabilizer aperture 292 (see FIG. 18). When the stabilizer strap 270 is under tension, such as at latter stages of deployment of the airbag cushion 210, the frictional engagement can prevent movement of the stabilizer strap 270 in the longitudinal direction. Moreover, the lateral side edges of the stabilizer aperture 292 likewise can prevent movement of the stabilizer strap 270 in the longitudinal direction. In the illustrated embodiment, longitudinal movement of the stabilizer strap 270 may be minimal in any event, as the alignment of the stabilizer aperture 292 and the catch 293 along a direction in which the airbag cushion 210 is deployed from the housing 290 can generally directly counteract the forces that would tend to move the airbag cushion 210 out of the housing 290 at the latter stages of deployment.

Figure 19A:
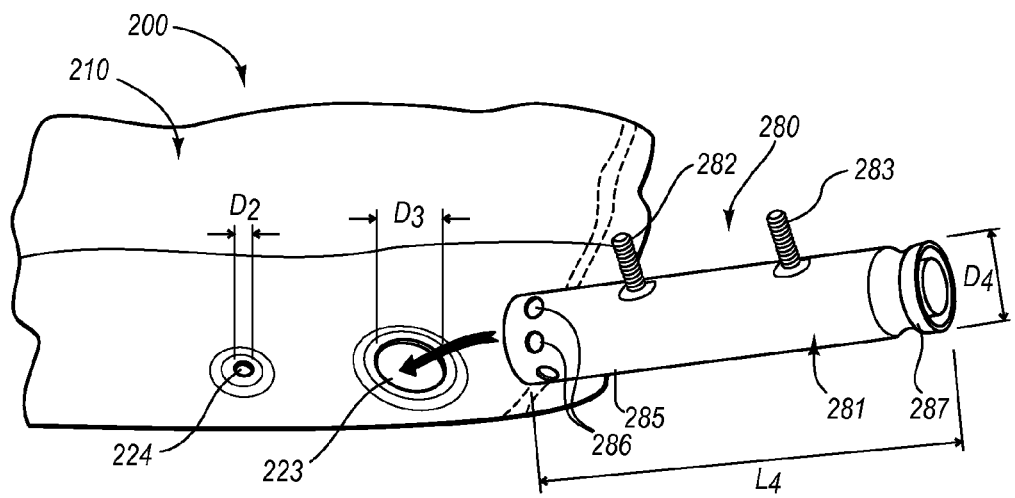
FIG. 19A is a close-up cutaway perspective view of a portion of another embodiment of an inflatable cushion airbag assembly.
Figure 19B:
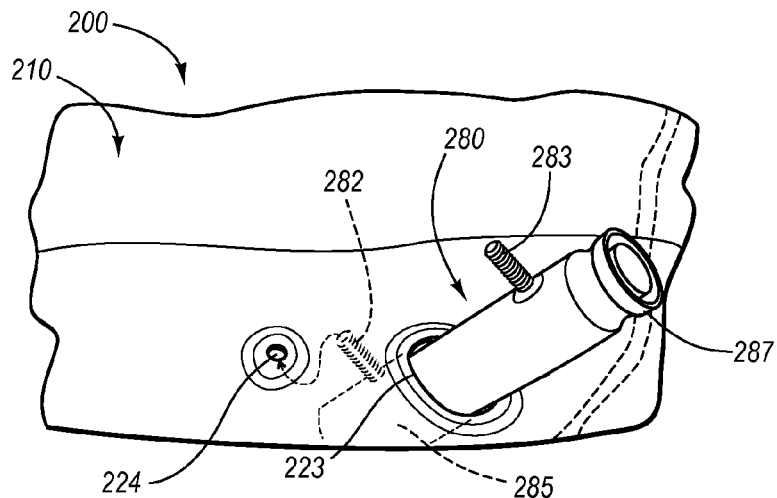
FIG. 19B is a close-up cutaway perspective view of the inflatable cushion airbag assembly of FIG. 19A after a step in a method for attaching an inflator has been performed.
Figure 19C:
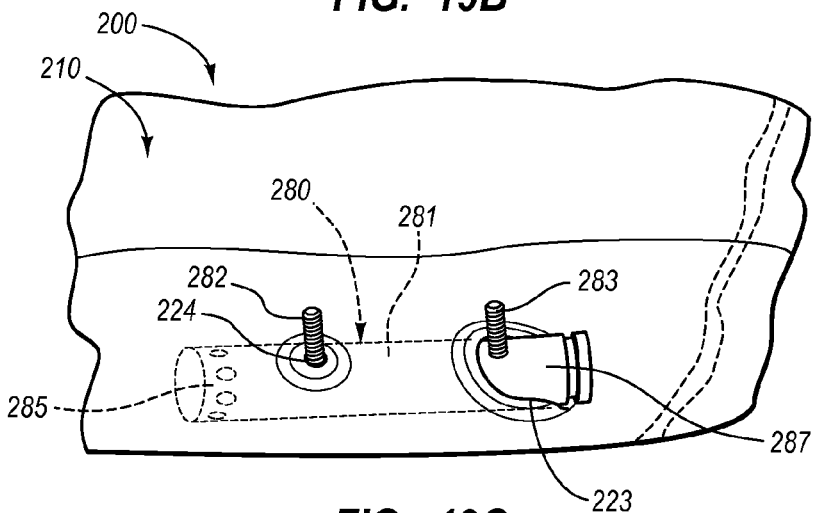
FIG. 19C is a close-up cutaway perspective view of the inflatable cushion airbag assembly of FIG. 19B after another step in a method for attaching an inflator has been performed.
Figure 20:
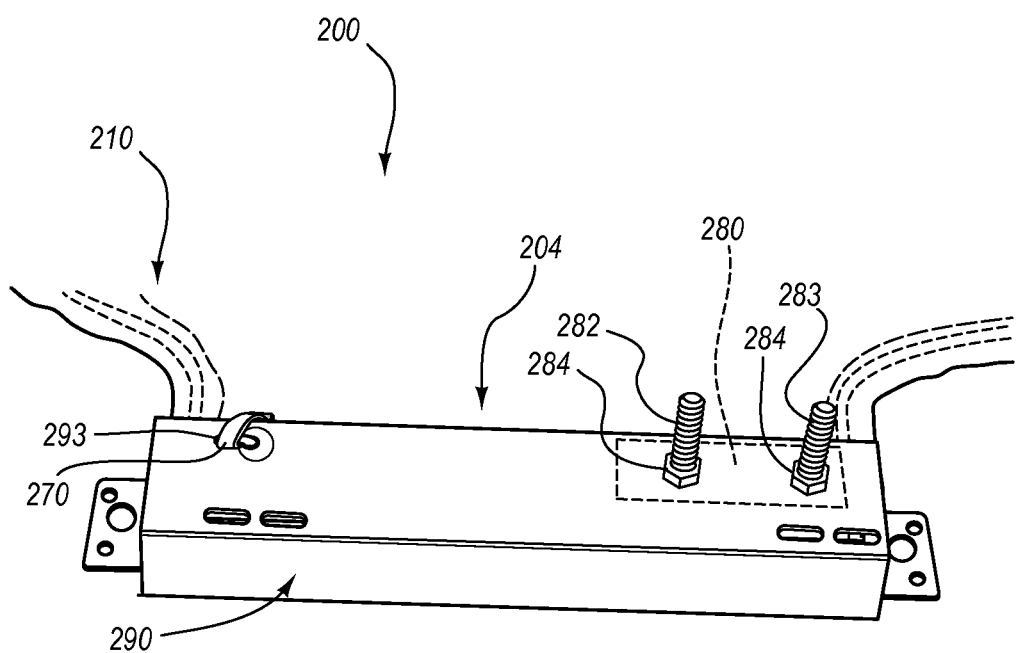
FIG. 20 is a close-up cutaway rear perspective view of the airbag assembly of FIG. 19A.

FIGS. 19A-20 are perspective views of a portion of inflatable cushion airbag assembly 200, wherein the figures depict a method and structures for coupling an inflator 280 to the airbag cushion membrane 210 and to the airbag housing 290. Inflator 280, cushion 210, and housing 290 are configured such that they may be employed in a method for coupling an airbag cushion to an airbag housing.

FIG. 19A is a close-up cutaway perspective view of a portion inflatable cushion airbag assembly 200, which depicts a first step in the method, wherein the step may comprise inserting first end 285 of inflator 280. Also, first inflator stem 282 is inserted into inflator insert aperture 223 of cushion 210. Cushion 210 comprises inflator insert aperture 223 and inflator stem aperture 224, which have diameters D3 and D2, respectively, which are of predetermined magnitudes. Diameter D2 of inflator mounting stem aperture 224 is configured such that it can receive a mounting stem from an inflator. As such the diameter of the mounting stem aperture may be about equal to, or slightly larger than the diameter of the mounting stem. Diameter D3 of aperture 223 is configured such that the aperture can accommodate the diameter D4 of inflator 280. As such, D3 of aperture 223 may be greater than the diameter D4 of inflator 280, or the diameters may be of about equal magnitude. In some embodiments, the magnitude of D2 may be from about 4.0 mm to about 8.0 mm. In one embodiment, D2 has a magnitude of about 6.5 mm. In some embodiments, the magnitude of D3 may be from about 20 mm to about 30 mm. In one embodiment, D3 has a magnitude of about 25 mm. The inflator insert aperture and/or the inflator mounting stem aperture may be strengthened and/or reinforced by stitching or additional material. In some embodiments, the magnitude of inflator diameter D4 may be from about 20 mm to about 30 mm. In one embodiment, D4 has a magnitude of about 25 mm.

Inflator 280 may comprises a pyrotechnic inflator with a tubular body 281, from which first and second mounting stems 282 and 283 protrude perpendicularly from the inflator body. The inflator 280 defines a first end 285 and a second end 287, wherein the first end 285 may have one or more vents 286 through which inflation gas can be expelled. Inflator 280 comprises a predetermined length $L_4$. In some embodiments, the magnitude of inflator length $L_4$ may be from about 100 mm to about 120 mm. In one embodiment, $L_4$ has a magnitude of about 108 mm. A distance between mounting stems may be from about 70 mm to about 90 mm. In one embodiment, the distance between mounting stems is about 80 mm. As such, the distance between the inflator insert aperture and the inflator mounting stem aperture may be from about 100 mm to about 120 mm, and in one embodiment, the distance is about 80 mm.

FIG. 19B is a close-up cutaway perspective view of the inflatable cushion airbag assembly of FIG. 94A after first end 285 and first mounting stem 282 of the inflator has been inserted into the inflator insert aperture. The method may further comprise pushing inflator 280 toward inflator stem aperture 224 of cushion 210. Inflator 280 may continue to be pushed in the direction of inflator stem aperture 224 until first inflator stem 282 is approximately aligned with aperture 224, but second end 287 has not been pushed through inflator insert aperture 223.

FIG. 19C is a close-up cutaway perspective view of the inflatable cushion airbag assembly 200 of FIG. 19B. A method for coupling an airbag cushion to an airbag housing via an inflator may further comprise threading or advancing first mounting stem 282 through inflator stem aperture 224. When inflator 280 is positioned properly, first end 285 is located within cushion 210, inflator stem 282 protrudes through aperture 224, and second inflator stem 283 and second end 287 protrude through aperture 223. Stem 283 may abut cushion 210 at a rim of aperture 223. The diameters of first inflator stem 282 and inflator stud aperture 224 may be configured such that during deployment, the junction between the stem and the aperture is substantially airtight. Likewise, the diameters of inflator body 281 and inflator insert aperture 223 may be configured such that during deployment, the junction between the inflator and the aperture is substantially airtight.

FIG. 20 is a close-up cutaway perspective view of the inflatable cushion airbag assembly 200 after another step in a method for attaching an inflator has been performed. The method may further comprise threading or advancing first and second inflator stems 282 and 283 of inflator 280 through corresponding housing mounting apertures 299 (see also FIG. 17). Cushion 210 may then be fixedly attached to housing 290 via mounting hardware, such as bolts 284, that matingly engage first and second inflator stems 282 and 283. The previous methods may be said to be methods for attaching an inflator or methods for attaching an airbag cushion to an airbag housing.

FIG. 20 also depicts the stabilizer strap 270 after the strap has been threaded through the strap aperture 292 (FIG. 18) and has been received by the catch 293. Stabilizer strap 270 may or may not be used in combination with the structures associated with the methods for coupling an airbag cushion to a housing via an inflator, as described above. Stabilizer strap 270 may be used in combination with cushion 210 and inflator 280, so that during inflatable airbag cushion deployment, the cushion does not rotate around the inflator and cushion attachment points. As such, the stabilizer strap prohibits the airbag cushion from skewing during deployment. Further discussion of the type of rotation and skewing that can be prevented by the stabilizer strap 270 is further discussed below with respect to FIG. 26.

FIGS. 21-26 depict another embodiment of an inflatable cushion airbag assembly 300 that can resemble the airbag assemblies 100, 200 described above in certain respects. Accordingly, like features are designated with like reference numerals, with the leading digits incremented to "3." Relevant disclosure set forth above regarding similarly identified features thus may not be repeated hereafter. Moreover, specific features of the airbag assembly 300 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 300. Any suitable combination of the features and variations of the same described with respect to the airbag assemblies 100, 200 can be employed with the airbag assembly 300, and vice versa.

Figure 21:
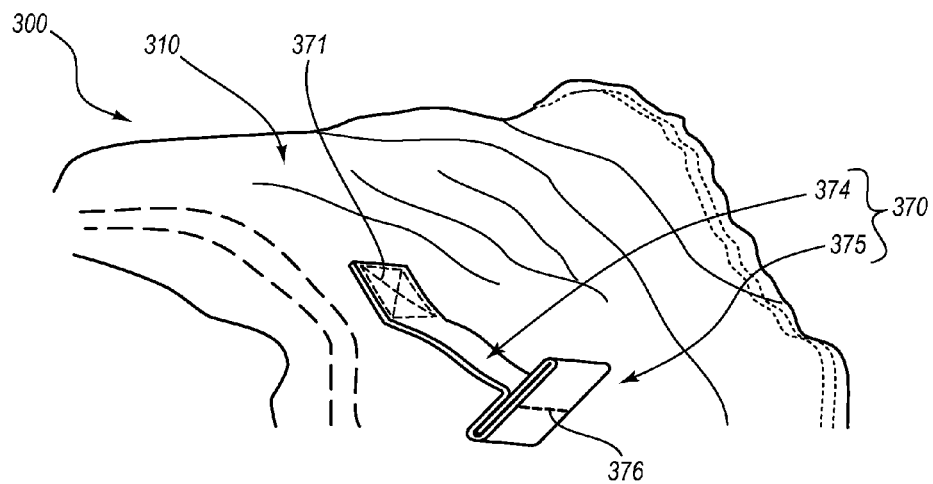
FIG. 21 is a close-up perspective view of a portion of another embodiment of an airbag assembly.

With reference to FIG. 21, the airbag assembly 300 can include an inflatable airbag cushion 310, such as those described above. For example, the airbag cushion 310 can be sized, shaped, and/or otherwise configured for use as a knee airbag. A stabilizer strap 370 can be coupled with the airbag cushion 310 in any suitable manner. In the illustrated embodiment, the stabilizer strap 370 is attached to the airbag cushion 310 via stitching 371. The stabilizer strap 370 can include multiple portions that have different thicknesses.

Figure 24:
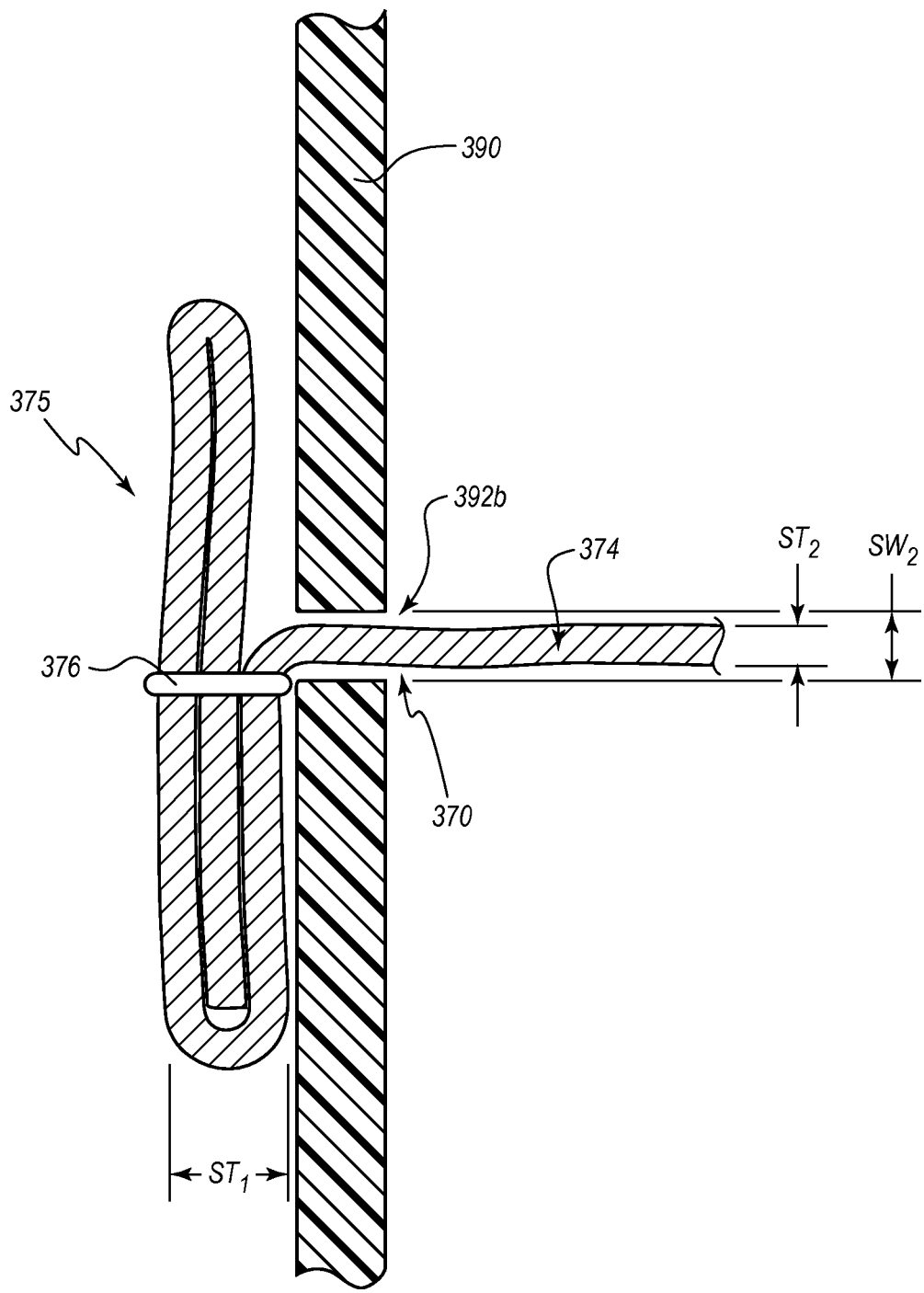
FIG. 24 is a cross-sectional view of a portion of the airbag assembly of FIG. 21.

With reference to FIGS. 21 and 24, in the illustrated embodiment, the stabilizer strap 370 includes a thin portion 374 and a thick portion 375. The thin portion 374 may also be referred to as a "threading portion" and the thick portion 375 may also be referred to as a "retaining portion" for reasons that will be apparent from the discussion below. The terms "thin" and "thick" are used relative to the stabilizer strap 370 itself. Thus, the retaining portion 375 is thicker than the threading portion 374. Moreover, as can be appreciated from the discussion hereafter, the retaining portion 375 can have multiple thicknesses. In the illustrated embodiment, the retaining portion 375 defines a different thickness at either side of the threading portion 374, each of which is thicker than the threading portion 374 itself.

In the illustrated embodiment, the stabilizer strap 370 comprises a unitary piece of strap material of any suitable variety. For example, in various embodiments, the strap material can comprise any suitable fabric, such as, e.g., nylon webbing. The threading portion 374 is formed from a single layer of the strap material, whereas the retaining portion 375 is formed from multiple layers of the strap material. In particular, the retaining portion 375 can be formed by rolling or folding the single layer of strap material back on itself two times and thereafter securing stitching 376 through the resultant three layers of the strap material. In the illustrated embodiment, the stitching 376 is formed at an approximate midpoint of the three-layered portion of the folded strap material. As a result, when the retaining portion 375 is oriented so as to extend laterally relative to the threading portion 374, as shown in FIGS. 21 and 24, the retaining portion 375 includes two overlapping layers of the strap material on one side of the stitching 376 and three overlapping layers of the strap material on the other side of the stitching 376. The stabilizer strap 370 substantially defines a T-shape when the retaining portion 375 is oriented transversely relative to the threading portion 374. In the illustrated embodiment, the retaining portion 375 extends laterally outwardly from the threading portion 374 by about the same distance on either side of the threading portion 374.

As can be seen in FIG. 24, in the illustrated embodiment, a distal end of the strap material can be sandwiched between two layers of the strap material and thus positioned at an interior of the retaining portion 375. Moreover, the retaining portion 375 can be at a distal end of the stabilizer strap 370. In other embodiments, the retaining portion 375 of the stabilizer strap 370 may be at a more intermediate position of the stabilizer strap 370 (e.g., the threading portion 374 may extend both distally and proximally relative to the retaining portion 375). However, in the illustrated embodiment, the T-shape of the stabilizer strap 370, in which the retaining portion 375 is at the distal end of the threading portion 374, can be complementary to a T-shaped portion of a housing 390 portion of the assembly 300. Such an arrangement can facilitate or otherwise aid in manufacture of the assembly 300, as further discussed below.

Figure 22:
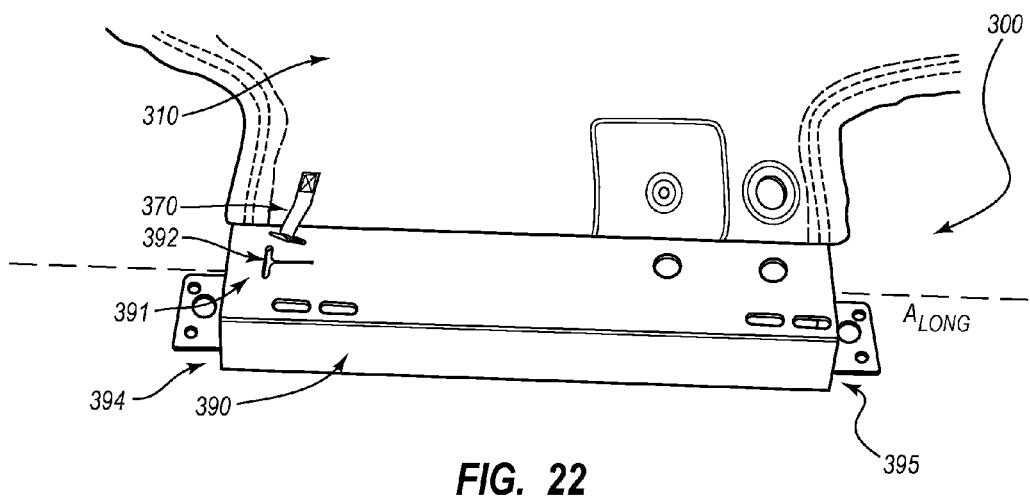
FIG. 22 is a rear perspective view of a further portion of the airbag assembly of FIG. 21 in which components thereof are not fully assembled.

With reference to FIG. 22, the housing 390 can define a mounting component 391 that is configured to interact with the stabilizer strap 370 so as to maintain at least a portion of the stabilizer strap 370 fixed relative to the housing 390 during deployment of the airbag cushion 310. In the illustrated embodiment, the mounting component 391 comprises a stabilizer aperture 392. The airbag cushion 310 and the housing 390 are shown in a pre-assembled state in FIG. 22. A method for coupling the stabilizer strap 370 with the housing 390 via the stabilizer aperture 392 is discussed hereafter with respect to FIGS. 23A-23D. Various dimensions of the stabilizer strap 370 and the opening 392 that are identified in FIG. 23D (i.e., $SW_1$ and $SW_3$) and in FIG. 24 (i.e., $ST_1$, $ST_2$, and $SW_2$) will be noted in this discussion.

Figure 23A:
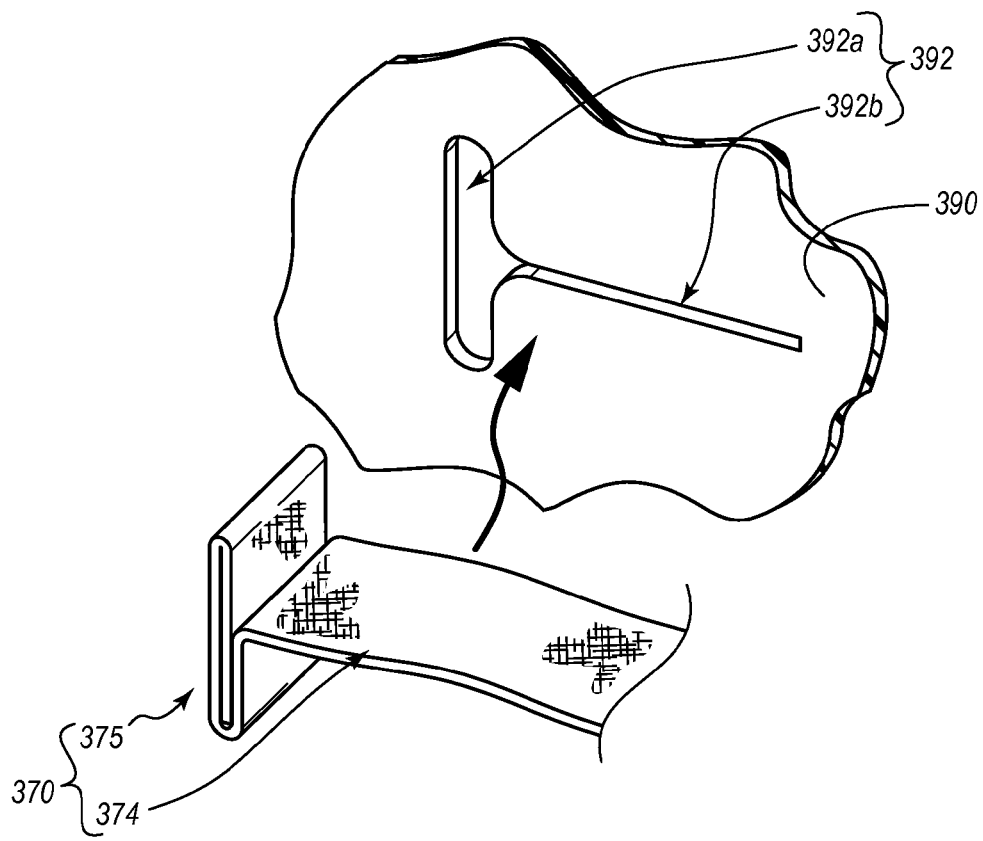
FIG. 23A is a cutaway interior perspective view of a portion of the housing and a portion of a stabilizer strap.

FIG. 23A depicts an interior surface of the housing 390. As shown, the stabilizer aperture 392 can include two substantially linear sections 392a, 392b that extend substantially perpendicularly to each other. Stated otherwise, the stabilizer aperture 392 can define a T-shape that is substantially complimentary to the T-shape of the stabilizer strap 370. In some embodiments, as further discussed below, at least a portion of the T-shape of the aperture 392 is slightly larger than the T-shaped portion of the stabilizer strap 370. In the illustrated embodiment, the width $SW_1$ (FIG. 23D) of the section 392a is greater than the width $SW_2$ (FIG. 24) of the section 392b. Thus, the section 392a may be referred to herein as the wide or wider section 392a, whereas the section 392b may be referred to as the thin or thinner section 392b. Moreover, for reasons that will be apparent from the following discussion, the section 392a may also be referred to as the insertion section 392a, and the section 392b may be referred to as the retention section 392b.

Figure 26:
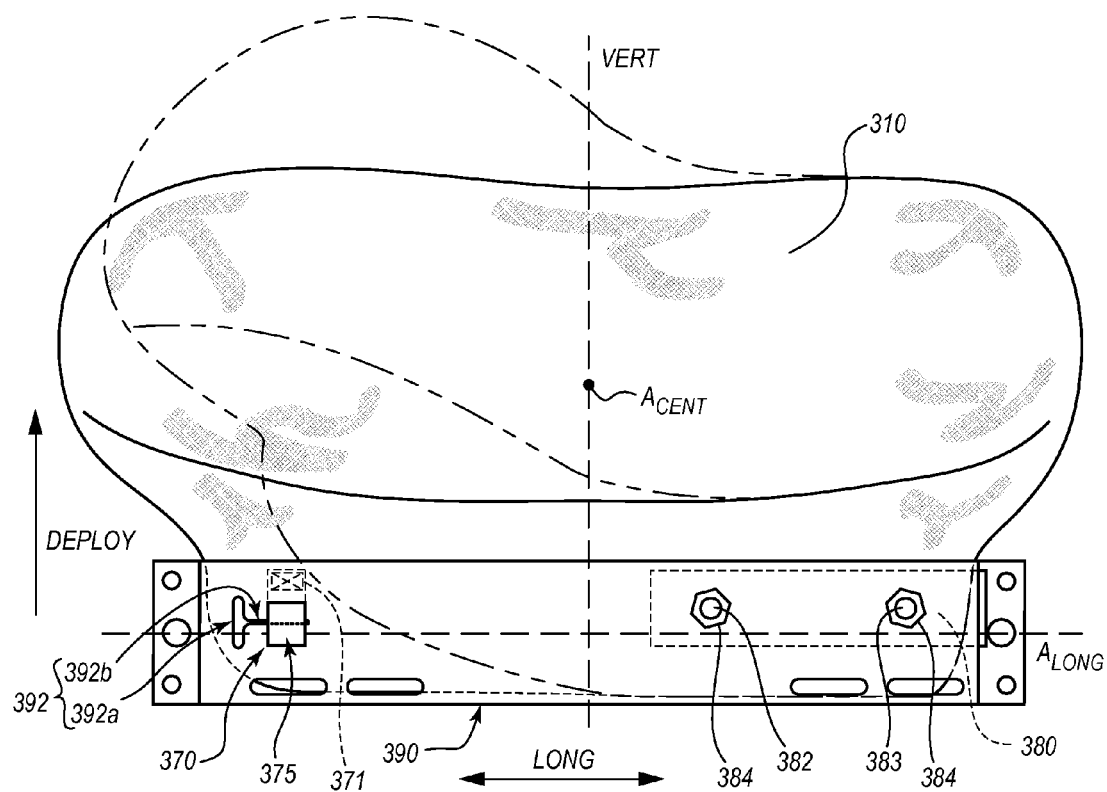
FIG. 26 is a top plan view of the airbag assembly of FIG. 21 in a deployed state.

With reference to both FIGS. 23A and 26, in the illustrated embodiment, the insertion section 392a extends substantially transversely relative to the longitudinal direction, and is elongated in a direction that roughly corresponds to at least an early stage deployment direction of the airbag cushion 310, which is identified in FIG. 26 by the arrow labeled "DEPLOY." The retention section 392b is elongated in the longitudinal direction, and thus extends substantially transversely to the airbag's general deployment direction. It is noted that the airbag cushion 310 does not deploy in a single direction, although it does generally deploy in a forward direction relative to the housing 390. For example, in some embodiments, the airbag cushion 310 may initially proceed downward out of the housing 390 so as to open a cover (not shown) at the bottom of the housing 390, may then proceed forwardly in a substantially horizontal direction, and may thereafter expand both upwardly and forwardly along a bottom of an instrument panel, which can be a desirable trajectory for knee airbags. Accordingly, the deployment direction "DEPLOY" is provided in FIG. 26 to generally illustrate an overall or net direction in which the airbag cushion 310 proceeds when it deploys from the housing 390.

With reference again to FIG. 23A, in an initial stage of coupling the stabilizer strap 370 with the housing 390, the stabilizer strap 370 can be aligned with the stabilizer opening 392 such that the retaining portion 375 of the stabilizer strap 370 correlates with (e.g., is coplanar with) a central axis of the insertion section 392a of the opening 392, and such that the thin portion of the stabilizer strap 370 correlates with (e.g., is coplanar with) a central axis of the retention section 392b of the opening 392. As shown by the bold arrow in FIG. 23A, the stabilizer strap 370 can be advanced toward the stabilizer opening 392 while in this orientation.

Figure 23B:
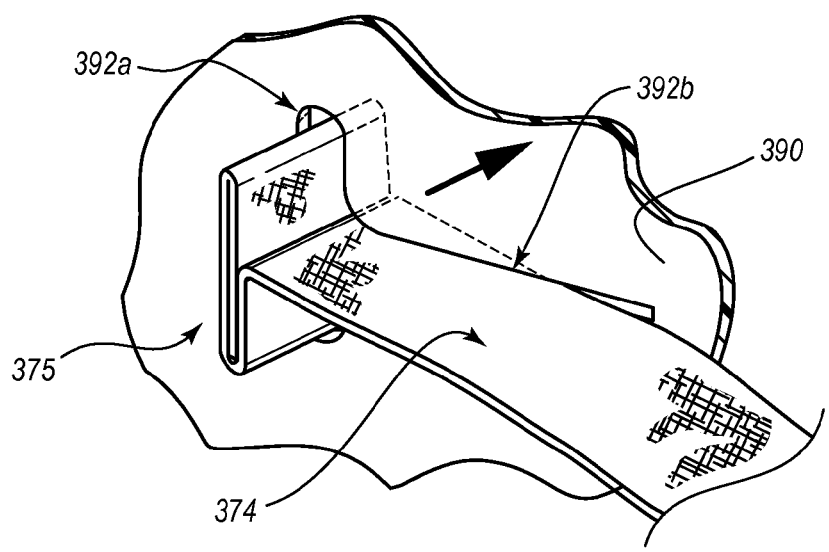
FIG. 23B is a cutaway interior perspective view such as that of FIG. 23A showing a thick portion of the stabilizer strap being advanced through an enlarged portion of an opening in the housing.

As depicted in FIG. 23B, an end portion of the stabilizer strap 370 can be advanced through the stabilizer opening 392. During this advancement stage, a longitudinal axis of the stabilizer strap 370 can be angled relative to the wall of the housing 390 that defines the opening 390. This angle can be affected by the length of the retention section 392b. A greater length of the retention section 392b can result in a smaller angle between the stabilizer strap 370 and the housing wall. Due to this angled relationship between the strap 370 and the housing, and due to a thickness of the housing wall, in some embodiments, it can be desirable for a width of the insertion section 392a of the stabilizer opening 390 to be somewhat greater than a thickness of the retaining portion 375 of the stabilizer strap 370 to ensure that the retaining portion 375 can readily pass through the insertion section 392a.

Figure 23C:
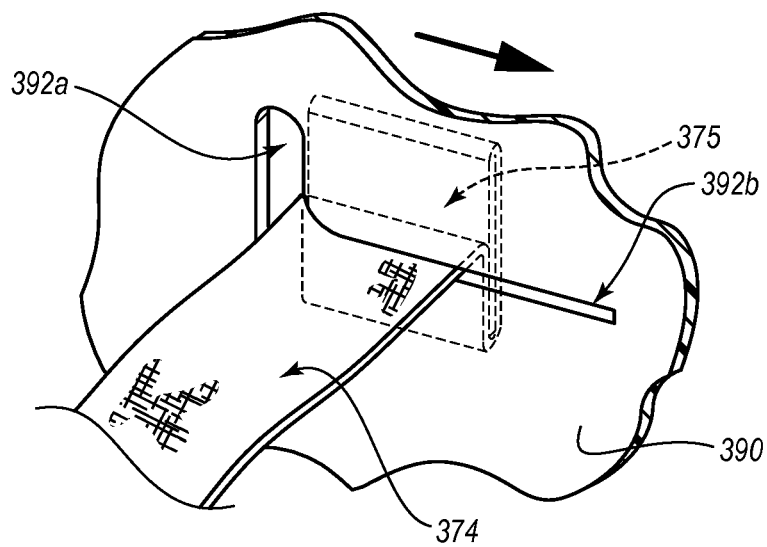
FIG. 23C is a cutaway interior perspective view such as that of FIG. 23A showing the thick portion of the stabilizer strap having been fully advanced through the enlarged portion of the opening in the housing while a thin portion of the stabilizer strap is maintained within a thinner portion of the opening in the housing.

As depicted in FIG. 23C, after the retaining portion 375 of the stabilizer strap 370 has passed through the insertion section 392a of the opening 390, the stabilizer strap 370 can be rotated. The retaining portion 375 is thus at an exterior of the housing 390, while at least a portion of the threading portion 374 remains at an interior of the housing 390.

Figure 23D:
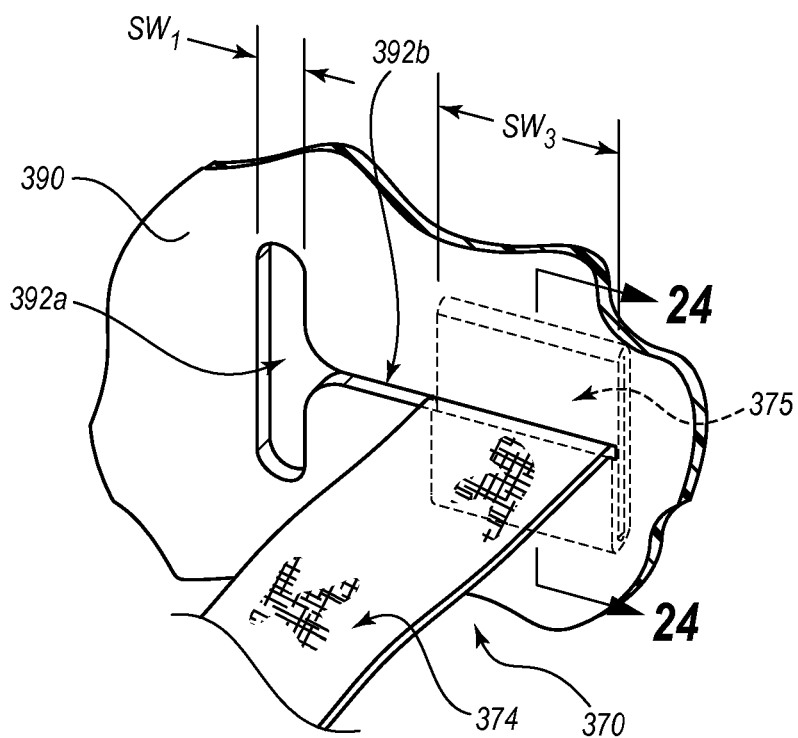
FIG. 23D is a cutaway interior perspective view such as that of FIG. 23A showing the stabilizer strap having been advanced to an end of the opening that is opposite of the enlarged portion.

As depicted in FIG. 23D, the stabilizer strap 370 can be advanced through the retention section 392b of the opening 392 to an end thereof that is opposite the insertion section 392a. In various embodiments, a width $SW_2$ of the retention section 392b can be about the same as or greater than the thickness $ST_2$ of the threading portion 374 of the stabilizer strap 370 so as to facilitate such lateral movement of the stabilizer strap 370 therein. In other embodiments, the width $SW_2$ of the retention section 392b can instead be slightly less than the thickness $ST_2$ of the threading portion 374 so as to permit such lateral movement of the stabilizer strap 370, but also provide frictional resistance to such lateral movement. In either case, the width $SW_2$ (FIG. 24) of the retention section 392b can desirably be less than a maximum thickness $ST_1$ (FIG. 24) of the retaining portion 375 of the stabilizer strap 370, which can prevent the retaining portion 375 from being pulled from an exterior of the housing 390 into the interior of the housing 390 through the retention section 392b of the opening 392. Moreover, the width $SW_3$ (FIG. 23D) of the stabilizer strap 370 can desirably be greater than the width $SW_1$ (FIG. 23D) of the insertion section 392a of the opening 390, which also can prevent the retaining portion 375 from being pulled from the exterior of the housing 390 into the interior or the housing 390 through the insertion section 392a of the opening 392, in the event that the stabilizer strap 370 were to be pulled back toward the insertion section 392a.

With reference to FIG. 24, in other embodiments, the maximum thickness $ST_1$ of the retaining portion 375 of the stabilizer strap 370 may be less than the width $SW_2$ of the retention section 392b of the opening 392. In such instances, the portion of the housing 390 that defines the retention section 392b can still prevent the retaining portion 375 from being pulled into the housing 290 because the portions of the retaining portion 375 that extend outwardly from the stitching 376 can bunch together as the stabilizer strap 370 is paced under tension, which can result in a mass of strap material having a greater thickness than the width $SW_2$ of the retention section 392b.

Figure 25:
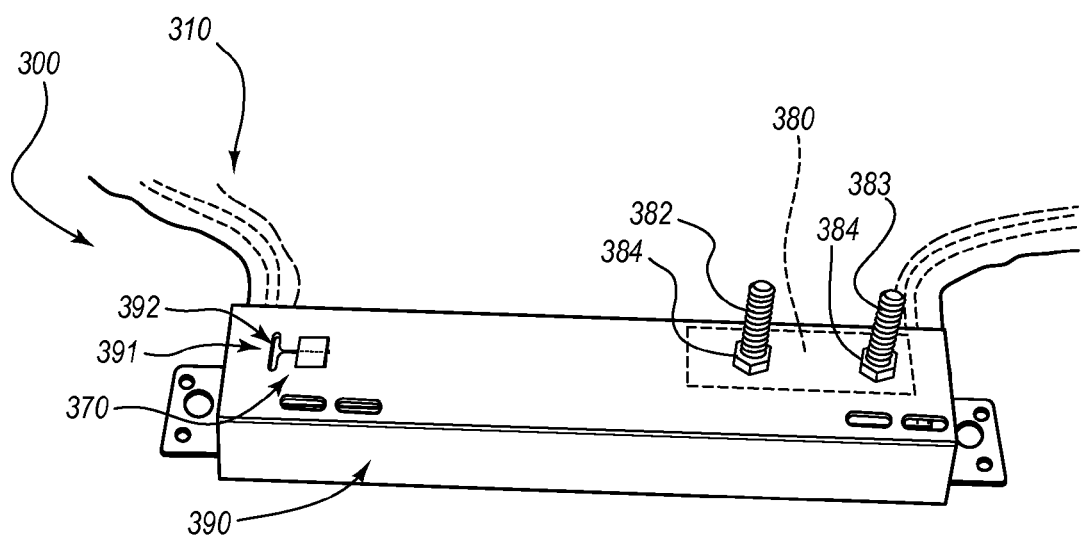
FIG. 25 is a rear perspective view of the airbag assembly of FIG. 21 in an assembled state.

FIG. 25 illustrates a partially assembled airbag assembly 300. A rearward end of the airbag cushion 310 has been coupled with the housing 390. The airbag cushion 310 is shown in an extended or unpackaged state. In other manufacturing processes, the airbag cushion 310 can be placed in a packaged state in manners such as described above prior to being coupled with the housing 390.

At one lateral end of the housing 390, the stabilizer strap 370 has been coupled with the mounting component 391 (i.e., the stabilizer opening 392). Thus the airbag cushion 310 is secured to the housing 390 at that lateral end of the housing 390. At the other lateral end of the housing 390, the inflator 380 has been coupled with the housing 390 via inflator stems 382, 383 and mounting hardware 384. The airbag cushion 390 can be sandwiched or held between the inflator 380 and the housing 390 in such an arrangement, as discussed above. Accordingly, the airbag cushion 310 is secured to the housing 390 at both lateral ends of the housing 390. Such an arrangement can permit a balanced or stable deployment of the airbag cushion 310.

FIG. 26 is a top plan view of an embodiment of the assembly 300 in which the airbag cushion 310 is fully deployed. In the illustrated embodiment, the airbag cushion 310 extends horizontally from the housing 390 for a short distance and then curves vertically upward (i.e., out of the page). In other embodiments, the curvature of the airbag cushion 310 toward the upper or distal end may be more gradual. For example, rather than extending substantially vertically (e.g., at about 90 degrees to the horizontal plane), an upper portion of the airbag cushion 310 may extend upward at a more gradual angle. In some embodiments, the airbag cushion 310 may instead follow the contour of a lower surface of a front panel or control panel of a vehicle.

As previously discussed, the stabilizer strap 370 can maintain a rearward end of the airbag cushion 310 within the housing 390 and can prevent the airbag cushion 310 from rotating or skewing. At one lateral end of the housing 390, the airbag cushion 310 is secured to the housing 390 via the inflator 380 and its associated stems 382, 383 and mounting hardware 384. However, if the inflatable airbag 310 were not secured at the other lateral end of the housing 390, the unsecured portion could have a tendency to exit the housing 390, which could result in skewing and/or rotation of the airbag 310 in an undesirable manner. An example of the skewing and rotation that could occur is shown in phantom lines in FIG. 26. In particular, the airbag cushion 310 could skew or rotate about the inflator 380—e.g., about the portion of the airbag cushion 310 that is secured to the housing 390 via the inflator 380. Such skewing and rotation may also be described relative to a central axis $A_{CENT}$ that passes through a center of an upper portion of the airbag cushion 310. In the illustrated embodiment, the central axis $A_{CENT}$ is substantially vertical (e.g., extends into and out of the page). In other embodiments, the central axis $A_{CENT}$ can define another angle relative to the horizontal plane (i.e., the plane of the page). The central axis $A_{CENT}$ can be contained within a vertical plane "VERT" that bisects the longitudinal axis $A_{LONG}$ of the housing 390. The airbag cushion 310 can rotate about and/or skew relative to the central axis $A_{CENT}$ when a lateral end of the airbag cushion 310 is unsecured.

As can be seen in FIG. 26, the stabilizer strap 370 prevents such rotation and skewing of the airbag cushion 310. In particular, the stabilizer strap 370 maintains that portion of the airbag cushion 310 that is attached thereto via the stitching 371 in a substantially fixed position relative to the housing 390.

In certain embodiments, the stabilizer opening 392 is oriented such that the insertion section 392a is substantially transverse to the longitudinal axis $A_{LONG}$ of the housing 390 and the retention section 392b is either parallel to (as shown) or collinear with the longitudinal axis $A_{LONG}$ of the housing 390. Moreover, the insertion section 392a is at an outward lateral position and the retention section 392b extends away from the insertion section 392a toward a center of the housing 390 (e.g., toward the vertical central plane of the housing 390). In such an arrangement, the deployment forces that would generally tend to rotate or skew the airbag cushion 310 instead urge the stabilizer strap 370 toward the end of the stabilizer opening 392 that is opposite from the insertion section 392a, which reduces the risk that the stabilizer strap 370 will be pulled free of the housing 390 through the insertion section 392a. In the illustrated embodiment, the retention section 392b of the stabilizer opening 392 is aligned with the mounting hardware 384 and stems 382, 383 of the inflator 380, which can result in the airbag cushion 310 deploying a substantially uniform distance from the housing 390 along its full lateral width. However, other arrangements in which the stabilizer opening 392 is not so aligned are also possible, since, for example, the stabilizer strap 370 may have different lengths in other embodiments.

The assembly 300 can be advantageous as it provides a simple and secure manner for attaching a free end of an airbag cushion 310 to the housing 390. Moreover, the arrangement can reduce material costs and facilitate assembly. For example, the stabilizer strap 370 is formed from a single piece of material, and the stabilizer strap 370 is not looped about a separate catch or other member that extends from the housing.

Other embodiments are also contemplated which are not shown in the drawings. For example, the stabilizer strap 370 can be formed in other manners. In some embodiments, rather than folding and sewing a single piece of material, a separate piece may be sewn to a piece of strap material. For example, the retaining portion 375 may instead be formed by a button-like piece of a hard material (e.g., plastic or metal) that is sewn to the end of a length of strap material.

Figure 27:
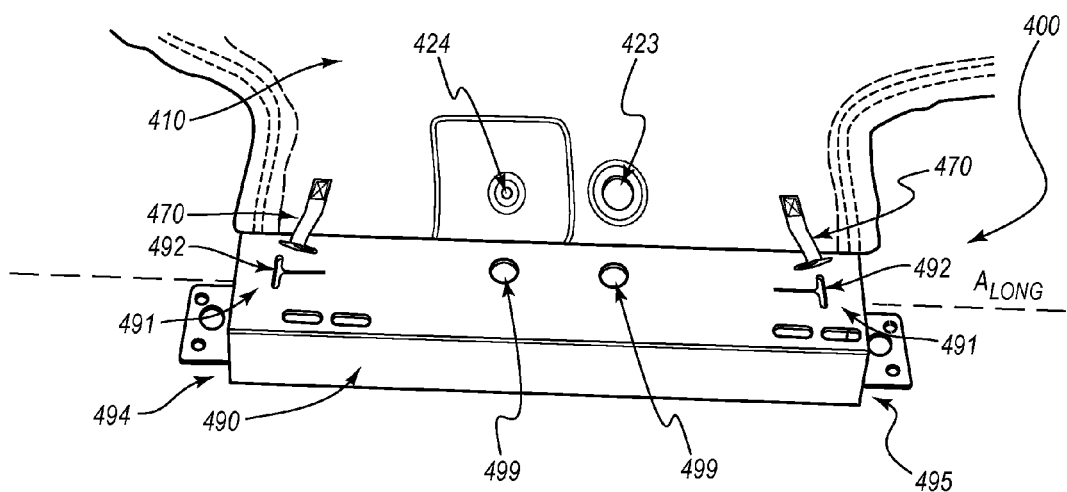
FIG. 27 is a rear perspective view of another embodiment of an airbag assembly in which components thereof are not fully assembled.
Figure 28:
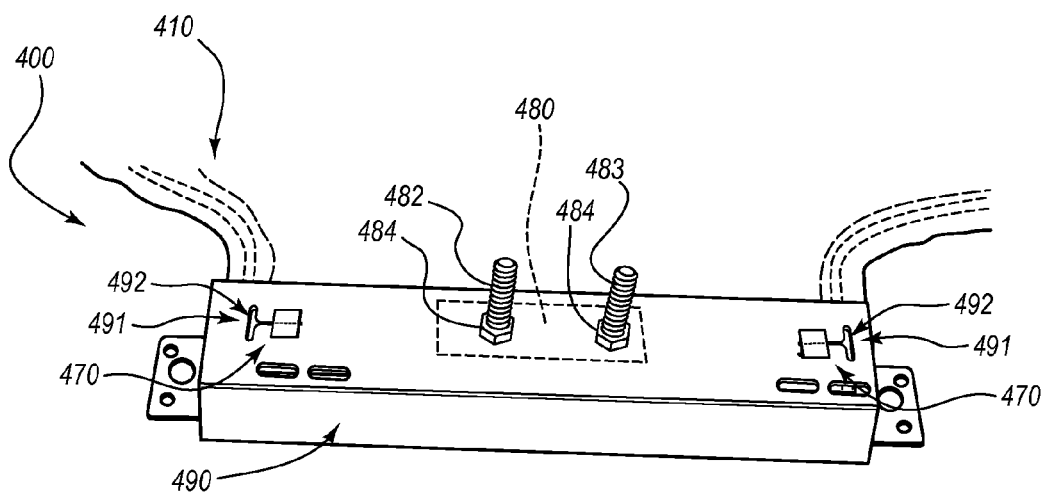
FIG. 28 is a rear perspective view of the airbag assembly of FIG. 27 in an assembled state.
Figure 29:
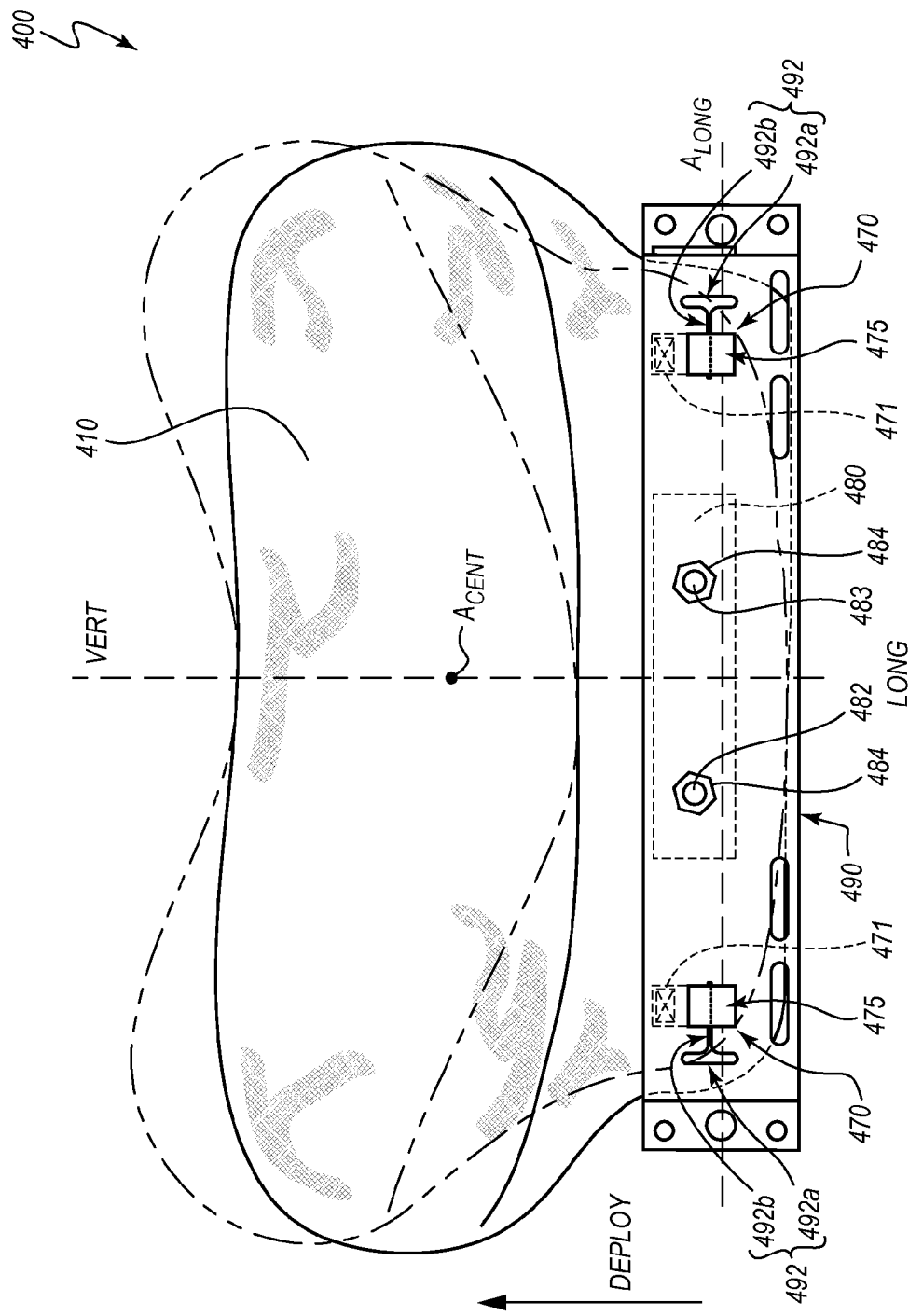
FIG. 29 is a top plan view of the airbag assembly of FIG. 27 in a deployed state.

FIGS. 27-29 depict another embodiment of an inflatable cushion airbag assembly 400 that can resemble the airbag assemblies 100, 200, 300 described above in certain respects. Accordingly, like features are designated with like reference numerals, with the leading digits incremented to "4." Relevant disclosure set forth above regarding similarly identified features thus may not be repeated hereafter. Moreover, specific features of the airbag assembly 400 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 400. Any suitable combination of the features and variations of the same described with respect to the airbag assemblies 100, 200, 300 can be employed with the airbag assembly 400, and vice versa.

With reference to FIG. 27, the airbag assembly 400 can include an inflatable airbag cushion 410, such as those described above. For example, the airbag cushion 410 can be sized, shaped, and/or otherwise configured for use as a knee airbag. Any desired number of stabilizer straps 470 can be coupled with the airbag cushion 410 in any suitable manner. In the illustrated embodiment, the assembly 400 includes two stabilizer straps 470, as discussed further below. Each stabilizer strap 470 can include a retaining portion 475, which in the illustrated embodiment, is formed of an end section of the stabilizer strap 475 that has been folded over and stitched in a manner such as discussed above with respect to the retaining portion 375. In the illustrated embodiment, the stabilizer straps 470 are at opposite sides of the airbag cushion 410. The airbag cushion 410 may include an inflator insert aperture 423 and in inflator step aperture 424, and a separate stabilizer strap 470 can be attached to the airbag cushion 410 at either side of the apertures 423, 424. In the illustrated embodiment, the apertures 423, 424 and the attachment regions of the stabilizer straps 470 are substantially aligned (e.g., are substantially collinear) with each other. Other arrangements are also contemplated.

The airbag assembly 400 can further include a housing 490 within which the airbag cushion 410 can be packaged. The housing 490 can resemble the housing 390 discussed above, except that the housing 490 includes any suitable number of attachment components 491 that are each configured to be coupled with a separate stabilizer strap 470. In the illustrated embodiment, the housing 490 includes two attachment components 491 that are positioned toward either lateral end 494, 495, the housing 490.

With reference to FIGS. 28 and 29, in the illustrated embodiment, each attachment component 491 is defined by a stabilizer aperture 492, each of which includes an insertion section 492a and a retention section 492b. As shown in FIG. 29, the insertion sections 492a can be positioned nearest the lateral ends of the housing 490, and the retention sections 492b can extend from the insertion sections 492a inwardly toward a central vertical plane VERT of the housing 490. The stabilizer straps 470 can be coupled with the stabilizer apertures 492 in manners such as described above, such that each stabilizer strap 470 cooperates with a stabilizer aperture 492 to limit movement of the airbag cushion 410, relative to the housing 490, of the portion of the airbag cushion 410 that is coupled to the stabilizer strap 470 (e.g., via stitching 471) so as to prevent skewing of the airbag cushion 410 during deployment thereof.

With reference again to FIGS. 28 and 29, the airbag cushion 410 can be attached to the housing 490 in manners such as discussed above. In the illustrated embodiment, the inflator 480 is inserted into the inflator insert aperture 423, and a mounting stem 482 that extends from the inflator 480 is threaded through the inflator stem aperture 424 from an interior of the airbag cushion 410 to an exterior thereof. Another mounting stem 483 protrudes through at least a portion of the inflator insert aperture 423 (see FIG. 19C). The inflator 480 is then coupled with the housing 490 via the inflator stems 482, 483 and mounting hardware 484. The airbag cushion 490 can be sandwiched or held between the inflator 480 and the housing 490 in such an arrangement, as discussed above. The airbag cushion 410 thus can be securely fastened to the housing 490 at an intermediate or central region thereof via the inflator 480. Further, the stabilizer straps 470 can be spaced from either lateral end of the inflator 480 so as to secure the airbag cushion 410 to the housing 490 at both lateral ends of the housing 490. Such an arrangement can permit a balanced or stable deployment of the airbag cushion 410.

Figure 30A:
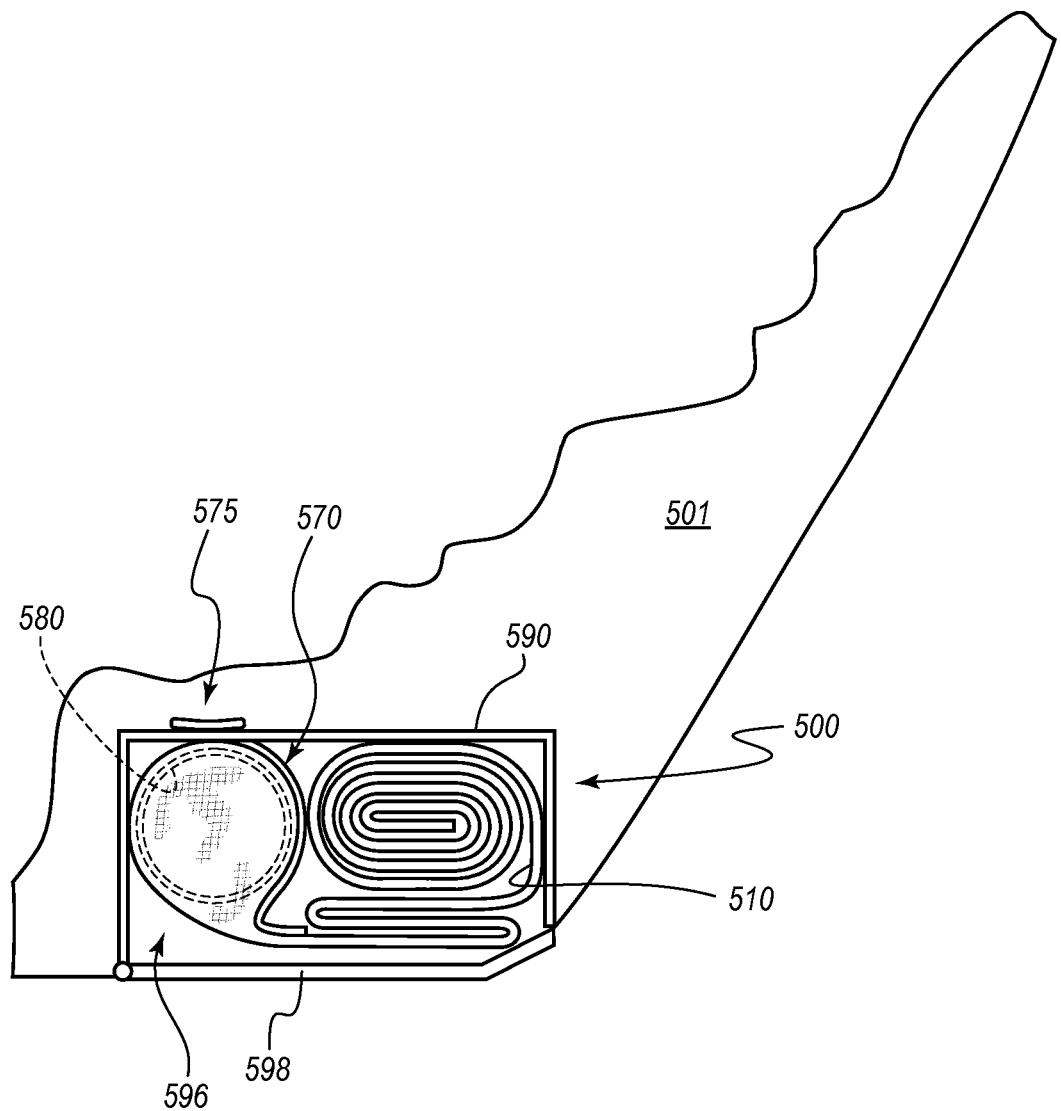
FIG. 30A is a side elevation cutaway view of another embodiment of an airbag assembly installed in a vehicle, wherein an airbag is in a packaged state.
Figure 30B:
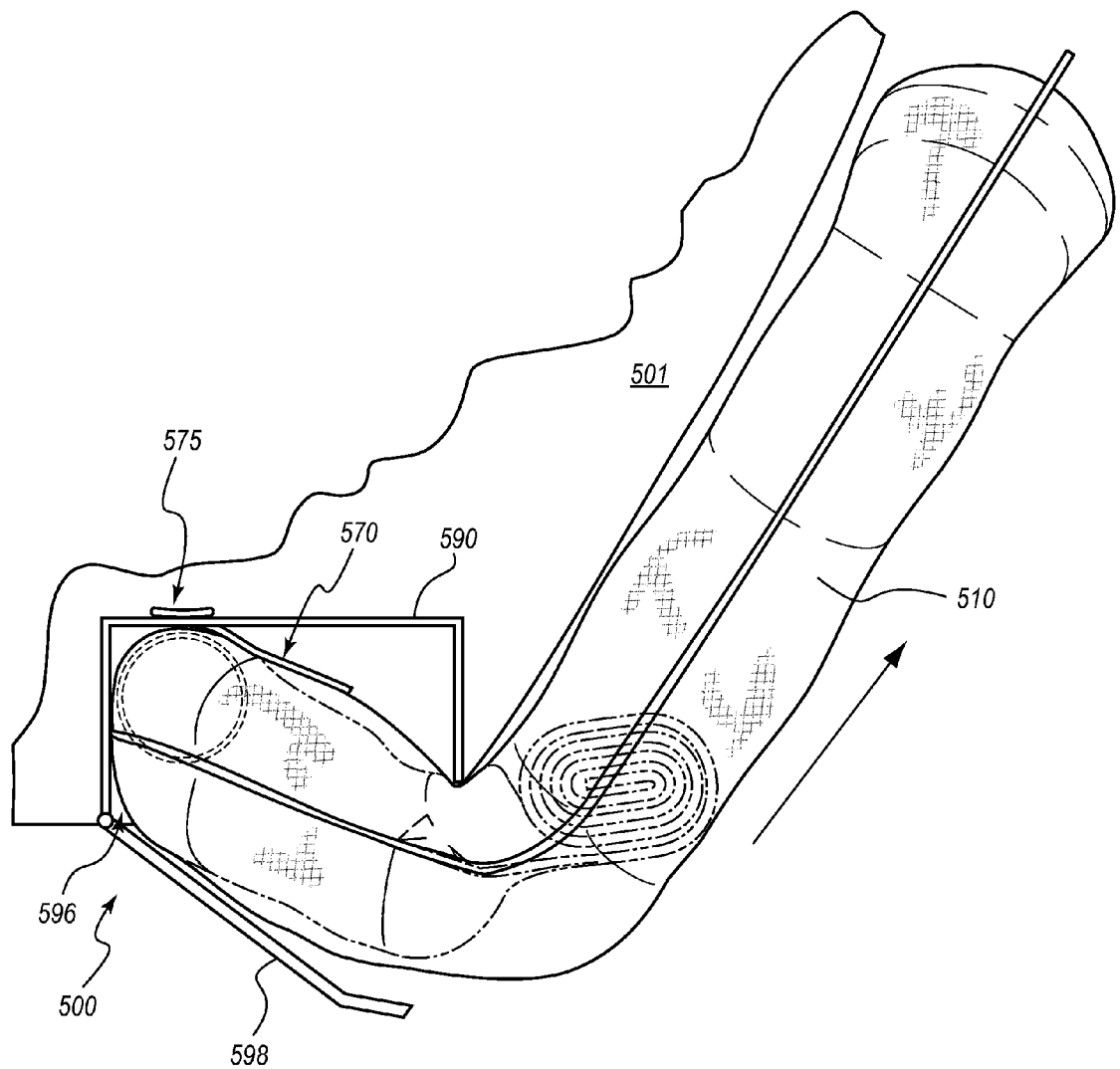
FIG. 30B is another side elevation cutaway view of the airbag assembly of FIG. 30B, wherein the airbag is in a deployed state.

FIGS. 30A and 30B illustrate a deployment sequence of another embodiment of an airbag assembly 500, which can resemble the airbag assemblies 100, 200, 300, 400 described above in certain respects. Accordingly, like features are designated with like reference numerals, with the leading digits incremented to "5." Relevant disclosure set forth above regarding similarly identified features thus may not be repeated hereafter. Moreover, specific features of the airbag assembly 500 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the airbag assembly 500. Any suitable combination of the features and variations of the same described with respect to the airbag assemblies 100, 200, 300, 400 can be employed with the airbag assembly 500, and vice versa.

As shown in FIG. 30A, the airbag assembly 500 includes an airbag 510 that is in a packaged state within a housing 590. The housing 590 defines a deployment opening 596 that is closed via a cover 598. The airbag 510 is secured to the housing 590 via an inflator 580 in a manner such as described above, although mounting hardware is not shown in FIGS. 30A and 30B. The assembly 500 is secured to an underside of an instrument panel or dashboard 501. The housing 590 can define one or more stabilizer apertures (not shown; see, e.g., FIG. 29) through which one or more stabilizer straps 570, respectively, can extend such that a retaining portion 575 of each strap 570 can be retained at an exterior of the housing 590. The stabilizer strap 570 is attached to the airbag 510 in any suitable manner, such as discussed above. As can be appreciated from FIG. 30A, the stabilizer aperture and the deployment aperture 596 are at opposite sides of the housing 590.

FIG. 30B illustrates the airbag 510 in a partially deployed state (in broken lines) and a fully deployed state (in solid lines). The airbag 510 can be configured to inflate along an underside of the dashboard 501 in an upward direction. During deployment of the airbag cushion 510, particularly once the airbag 510 has been fully inflated as shown, the stabilizer strap or straps 570 can prevent skewing of the airbag cushion 510.

One skilled in the art will appreciate that a variety of inflators and airbag housings may be used without deviating from the spirit of the present disclosure. For example, the size and shape of the inflators may differ from those described herein. Further, the inflator mounting stems may not be integral to the inflator, but rather, in some embodiments, an inflator housing may be employed that provides the mounting stems. Additionally, the inflator and/or housing may comprise less than or more than two mounting stems and those mounting stems may be oriented axially to the inflator body, rather than perpendicularly as described herein. Airbag housing 290 may not comprise a complete housing, but rather may define a mounting structure that may or may not be a subcomponent of an airbag housing.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶ 6. The scope of the disclosure is therefore defined by the following claims.

The invention claimed is:

1. An airbag assembly comprising:
 a housing elongated in a longitudinal direction such that a longitudinal axis of the housing extends between a first end and a second end of the housing, wherein the housing comprises a mounting component that is closer to the first end of the housing than it is to the second end;
 an inflator coupled to the housing at a position that is closer to the second end of the housing than is the mounting component, wherein the inflator is configured to be activated in response to vehicle conditions as detected by one or more vehicle sensors;
 an inflatable airbag cushion that is coupled to the housing; and
 a stabilizer strap coupled to a portion of the inflatable airbag cushion and coupled to the mounting component of the housing to be retained by the mounting component, wherein an entirety of the stabilizer strap is closer to the first end of the housing than it is to the second end,
 wherein the stabilizer strap is configured to prevent the portion of the inflatable airbag cushion that is coupled to the stabilizer strap from rotating about the position at which the inflator is coupled to the housing so as to inhibit skewing of the inflatable airbag cushion during deployment thereof, and
 wherein the mounting component is configured to retain the stabilizer strap throughout a full deployment of the inflatable airbag cushion whenever the vehicle conditions are such that the inflator is activated.

2. The airbag assembly of claim 1, wherein the stabilizer strap is configured to prevent skewing of the inflatable airbag cushion about a central rotational axis of the airbag assembly that is within a plane that bisects the longitudinal axis of the housing and is perpendicular to a direction of deployment of the inflatable airbag cushion.

3. The airbag assembly of claim 1, wherein the mounting component of the housing comprises a catch that projects outwardly from a surface of the housing, and wherein a portion of the stabilizer strap extends about the catch.

4. The airbag assembly of claim 1, wherein the mounting component of the housing comprises a stabilizer opening through the housing that is separate from and smaller than a deployment opening of the housing through which the inflatable airbag cushion is configured to be deployed.

5. The airbag assembly of claim 4, wherein the stabilizer strap extends through the stabilizer opening from a position at an interior of the housing, and wherein a portion of the stabilizer strap is configured to be retained at an exterior of the housing during deployment of the inflatable airbag cushion.

6. The airbag assembly of claim 5, wherein the portion of the stabilizer strap that is positioned at an exterior of the housing is sized and oriented so as to interact with the portion of the housing that defines the stabilizer opening to thereby prevent the portion of the stabilizer strap from being pulled through the stabilizer opening toward the interior of the housing during deployment of the inflatable airbag cushion.

7. The airbag assembly of claim 6, wherein the stabilizer strap comprises a fabric material, and wherein said portion of the stabilizer strap that is positioned at an exterior of the housing comprises a multi-layered section of the fabric material.

8. The airbag assembly of claim 4, wherein at least a portion of the stabilizer opening defines a T-shaped slot having an insertion section that extends substantially perpendicularly to a retention section.

9. The airbag assembly of claim 8, wherein the retention section of the T-shaped slot is one of collinear with and parallel to the longitudinal axis of the housing so as to be generally perpendicular to a deployment direction of the inflatable airbag cushion.

10. The airbag assembly of claim 8, wherein the stabilizer strap comprises a wider portion and a thinner portion, wherein the wider portion of the stabilizer strap is sized to be inserted through the insertion section of the T-shaped slot, and wherein a thickness of the wider portion of the stabilizer strap is greater than a width of the retention section of the T-shaped slot.

11. The airbag assembly of claim 4, wherein a portion of the stabilizer strap is attached to a catch at an exterior of the housing.

12. The airbag assembly of claim 4, wherein at least a portion of the stabilizer opening is aligned with mounting hardware that secures the inflator to the housing along a line that is one of collinear with and parallel to the longitudinal axis of the housing.

13. The airbag assembly of claim 1, wherein the inflator is coupled to the housing at a position that is closer to the second end of the housing than it is to the first end of the housing.

14. The airbag assembly of claim 1, wherein the housing further comprises an additional mounting component that is closer to the second end of the housing than it is to the first end, and wherein the airbag assembly further comprises an additional stabilizer strap coupled to a portion of the inflatable airbag cushion and coupled to the additional mounting component of the housing, wherein an entirety of the additional stabilizer strap is closer to the second end of the housing than it is to the first end, and wherein the additional stabilizer strap is configured to prevent the portion of the inflatable airbag cushion that is coupled to the additional stabilizer strap from rotating about the position at which the inflator is coupled to the housing so as to inhibit skewing of the inflatable airbag cushion during deployment thereof.

15. The airbag assembly of claim 14, wherein one of the mounting components and the stabilizer strap that is coupled therewith are longitudinally spaced from a first lateral end of the inflator in a first direction, and wherein the other mounting component and the stabilizer strap that is coupled therewith are longitudinally spaced from a second lateral end of the inflator in a second direction that is opposite of the first direction.

16. An airbag assembly comprising:
a housing elongated in longitudinal direction such that a longitudinal axis of the housing extends between a first end and a second end of the housing, the housing defining a deployment opening and a stabilizer opening that are spaced from each other, wherein the stabilizer opening is closer to the first end of the housing than it is to the second end;
an inflator coupled to the housing at a position that is closer to the second end of the housing than is the stabilizer opening;
an inflatable airbag cushion that is coupled to the housing via the inflator such that a portion of the airbag is held between the housing and the inflator; and
a stabilizer strap that is coupled to a portion of the inflatable airbag cushion and extends through the stabilizer opening of the housing to an exterior of the housing,
wherein a portion of the stabilizer strap is configured to interact with a portion of the housing so as to retain the portion of the stabilizer strap at the exterior of the housing during deployment of the inflatable airbag cushion, and
wherein the stabilizer strap is configured to prevent the portion of the inflatable airbag cushion that is coupled to the stabilizer strap from rotating about the position at which the inflator is coupled to the housing so as to inhibit skewing of the inflatable airbag cushion during deployment thereof, and
wherein the portion of the stabilizer strap at an exterior of the housing is sized and oriented so as to interact with the portion of the housing that defines the stabilizer opening to thereby prevent the portion of the stabilizer strap from being pulled through the stabilizer opening toward an interior of the housing during deployment of the inflatable airbag cushion.

17. The airbag assembly of claim 16, wherein the deployment opening of the housing is elongated in the longitudinal direction.

18. The airbag assembly of claim 16, wherein the housing defines a catch at an exterior thereof, and wherein the portion of the stabilizer strap encompasses the catch so as to be maintained at the exterior of the housing.

19. The airbag assembly of claim 18, wherein the catch is closer to the first end of the housing than it is to the second end.

20. The airbag assembly of claim 16, wherein the stabilizer opening defines an insertion section that is joined to a retention section, wherein the stabilizer strap comprises a retaining portion that extends transversely from a threading portion, wherein the retaining portion of the stabilizer strap is thinner than the insertion section of the stabilizer opening and thicker than the retaining section of the stabilizer opening, and wherein the retaining portion of the stabilizer strap is configured to interact with the portion of the housing that defines the retention section of the stabilizer opening so as to be retained at the exterior of the housing during deployment of the inflatable airbag cushion.

21. The airbag assembly of claim 20, wherein a perimeter of the stabilizer opening defines a profile that is complementary to and slightly larger than a profile defined by the retaining and threading portions of the stabilizer strap, such that the retaining and threading portions of the stabilizer strap can be pushed through the insertion and retention sections of the stabilizer opening, respectively, when said portions and sections are properly aligned.

22. The airbag assembly of claim 20, wherein the threading portion of the stabilizer strap is either thinner than or approximately the same thickness as the retention section of the stabilizer opening.

23. The airbag assembly of claim 16, wherein the inflator is coupled to the housing at a position that is closer to the second end of the housing than it is to the first end of the housing.

24. The airbag assembly of claim 16, wherein the housing further defines an additional stabilizer opening that is closer to the second end of the housing than it is to the first end, and wherein the airbag assembly further comprises an additional stabilizer strap that is coupled to a portion of the inflatable airbag cushion and extends through the additional stabilizer opening of the housing to an exterior of the housing, wherein a portion of the additional stabilizer strap is configured to interact with a portion of the housing so as to retain the portion of the additional stabilizer strap at the exterior of the housing during deployment of the inflatable airbag cushion, and wherein the additional stabilizer strap is configured to prevent the portion of the inflatable airbag cushion that is coupled to the additional stabilizer strap from rotating about the position at which the inflator is coupled to the housing so as to inhibit skewing of the inflatable airbag cushion during deployment thereof.

25. The airbag assembly of claim 24, wherein one of the stabilizer openings and the stabilizer strap that extends through it are longitudinally spaced from a first lateral end of the inflator in a first direction, and wherein the other stabilizer opening and the stabilizer strap that extends through it are longitudinally spaced from a second lateral end of the inflator in a second direction that is opposite of the first direction.

26. The airbag assembly of claim 16, wherein the deployment opening and the stabilizer opening are at opposite sides of the housing.

27. A method of assembling an airbag assembly, the method comprising:
    providing a housing that is elongated in a longitudinal direction and that defines a stabilizer opening spaced from a deployment opening through which an inflatable airbag cushion can be deployed;
    providing an inflatable airbag cushion that comprises a stabilizer strap coupled therewith and an aperture for receiving a portion of an inflator;
    inserting a portion of an inflator through the aperture of the inflatable airbag cushion;
    coupling the inflator to the housing so as to thereby attach the airbag to the housing; and
    advancing a portion of the stabilizer strap from an interior of the housing, through the stabilizer opening of the housing, and to an exterior of the housing such that the portion of the stabilizer strap can be retained at an exterior of the housing during deployment of the inflatable airbag cushion,
    wherein the stabilizer opening comprises a T-shaped portion that includes an insertion section and a retention section, wherein the portion of the stabilizer strap is thinner than the insertion section of the stabilizer opening and is thicker than the retention section of the stabilizer opening, and wherein the portion of the stabilizer strap is advanced through the insertion section of the stabilizer opening.

28. The method of claim 27, further comprising moving the portion of the stabilizer strap away from the insertion section of the stabilizer opening to a position within the retention section of the stabilizer opening.

* * * * *